United States Patent
Kajiwara

(10) Patent No.: US 10,295,663 B2
(45) Date of Patent: May 21, 2019

(54) SEMICONDUCTOR DEVICE, CONTROL SYSTEM AND OBSERVATION METHOD

(71) Applicant: Renesas Electronics Corporation, Tokyo (JP)

(72) Inventor: Yuki Kajiwara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 416 days.

(21) Appl. No.: 15/153,087

(22) Filed: May 12, 2016

(65) Prior Publication Data

US 2017/0010349 A1  Jan. 12, 2017

(30) Foreign Application Priority Data

Jul. 10, 2015 (JP) ................. 2015-138676

(51) Int. Cl.
*G01S 7/04* (2006.01)
*G01S 13/87* (2006.01)
(Continued)

(52) U.S. Cl.
CPC ............ *G01S 13/87* (2013.01); *G01S 7/04* (2013.01); *G01S 7/298* (2013.01); *G01S 7/2955* (2013.01);
(Continued)

(58) Field of Classification Search
CPC ........ G01S 13/87; G01S 13/878; G01S 7/295; G01S 7/2955; G01S 7/298; G01S 7/24; G01S 13/931
See application file for complete search history.

(56) References Cited

U.S. PATENT DOCUMENTS

| 5,036,326 A | * | 7/1991 | Andrieu | G01S 7/298 |
| | | | | 342/176 |
| 5,483,567 A | * | 1/1996 | Swerdloff | G01N 23/046 |
| | | | | 250/363.04 |

(Continued)

FOREIGN PATENT DOCUMENTS

| GB | 2093306 A | 8/1982 |
| JP | 3990830 B2 | 10/2007 |
| JP | 4917270 B2 | 4/2012 |

OTHER PUBLICATIONS

Communication dated Dec. 19, 2016, from the European Patent Office in counterpart European Application No. 16178630.6.

*Primary Examiner* — Peter M Bythrow
(74) *Attorney, Agent, or Firm* — McDermott Will & Emery LLP

(57) ABSTRACT

A semiconductor device includes a data obtaining unit that obtains a plurality of data items each indicating a result of observation from a plurality of radars for observing surroundings, converts the plurality of data items into data items in a polar coordinate format, and stores them in a storage unit, an axial position converting unit that performs conversion on the plurality of data items in the polar coordinate data format stored in the storage unit so that their axial positions will be the same, generates the plurality of data items on which axial position conversion has been performed, and stores them in the storage unit, a data superimposing unit that superimposes the plurality of data items on which the axial position conversion has been performed to generate superimposed data, and a coordinate converting unit that converts the superimposed data into data in a Cartesian coordinate format.

11 Claims, 15 Drawing Sheets

(51) Int. Cl.
*G01S 13/89* (2006.01)
*G01S 13/93* (2006.01)
*G01S 7/295* (2006.01)
*G01S 7/298* (2006.01)

(52) U.S. Cl.
CPC ............ G01S 13/878 (2013.01); G01S 13/89 (2013.01); G01S 13/931 (2013.01); *G01S 2013/9342* (2013.01); *G01S 2013/9346* (2013.01); *G01S 2013/9375* (2013.01); *G01S 2013/9378* (2013.01); *G01S 2013/9385* (2013.01); *G01S 2013/9389* (2013.01)

(56) References Cited

U.S. PATENT DOCUMENTS

| | | | | |
|---|---|---|---|---|
| 5,519,401 A * | 5/1996 | Farmer | ............... | G01S 7/298 342/185 |
| 5,554,992 A * | 9/1996 | Toth | ............... | G01S 7/295 342/185 |
| 5,742,297 A * | 4/1998 | Logan | ............... | G06T 3/0081 345/672 |
| 6,140,955 A * | 10/2000 | Andrusiak | ............... | G01S 7/12 342/185 |
| 6,225,942 B1 * | 5/2001 | Alon | ............... | G01S 7/4004 342/59 |
| 6,400,313 B1 * | 6/2002 | Morici | ............... | G01S 7/003 342/176 |
| 6,829,536 B2 * | 12/2004 | Moore | ............... | G01W 1/10 702/3 |
| 7,471,234 B1 * | 12/2008 | Lang | ............... | G01S 7/064 342/26 R |
| 7,541,973 B2 * | 6/2009 | Fujikawa | ............... | G01S 7/04 342/176 |
| 7,646,328 B2 * | 1/2010 | Makkapati | ............... | G01S 7/18 342/26 R |
| 7,706,978 B2 * | 4/2010 | Schiffmann | ............... | G01S 7/4026 340/436 |
| 7,821,448 B2 * | 10/2010 | Mahapatra | ............... | G01S 7/12 342/179 |
| 8,730,090 B2 * | 5/2014 | Nakahama | ............... | G01S 7/295 342/90 |
| 9,041,588 B2 * | 5/2015 | Yasugi | ............... | G01S 13/867 342/189 |
| 9,151,836 B2 * | 10/2015 | Lee | ............... | G01S 7/292 |
| 9,557,410 B2 * | 1/2017 | Takaki | ............... | G01S 7/2922 |
| 9,575,173 B2 * | 2/2017 | Nishiyama | ............... | G01S 7/12 |
| 2003/0169943 A1 * | 9/2003 | Stanek | ............... | G01S 7/295 382/278 |
| 2004/0227660 A1 * | 11/2004 | Scott | ............... | G01S 7/22 342/26 R |
| 2005/0035897 A1 * | 2/2005 | Perl | ............... | G01S 5/12 342/29 |
| 2006/0202886 A1 * | 9/2006 | Mahapatra | ............... | G01S 7/12 342/176 |
| 2009/0121923 A1 * | 5/2009 | Mainds | ............... | G01S 7/298 342/185 |
| 2012/0133546 A1 * | 5/2012 | Reiter | ............... | G01S 7/12 342/59 |
| 2013/0234880 A1 * | 9/2013 | Lee | ............... | G01S 13/345 342/70 |
| 2016/0320482 A1 * | 11/2016 | Ling | ............... | G01S 13/931 |
| 2016/0363648 A1 * | 12/2016 | Mindell | ............... | H04W 4/029 |

\* cited by examiner

SEMICONDUCTOR DEVICE, CONTROL SYSTEM AND OBSERVATION METHOD

CROSS-REFERENCE TO RELATED APPLICATIONS

This application is based upon and claims the benefit of priority from Japanese patent application No. 2015-138676, filed on Jul. 10, 2015, the disclosure of which is incorporated herein in its entirety by reference.

BACKGROUND

The present invention relates to a semiconductor device, a control system, and an observation method, and to, for example, a technique for observing surroundings by a plurality of radars.

Japanese Patent No. 4917270 discloses a radar device that aims to correctly combine search data items obtained from a plurality of radar antennas and display combined data item on a single indicator. In this radar device, search data generating means generates search data items in a polar coordinate system from respective search signals generated by the plurality of radar antennas. Correlation processing means performs correlation processing on the search data items and stores processed data items as correlation processed data items in a Cartesian coordinate system. Display image data selecting means selects the correlation processed data item corresponding to a particular antenna in a region corresponding to the particular antenna and outputs it to display image data storage means. In other regions, the display image data selecting means selects the correlation processed data items corresponding to antennas other than the particular antenna and outputs them to the display image data storage means.

However, the present inventor has found a problem in the technique disclosed in Japanese Patent No. 4917270, that as a correlation processed data item in the Cartesian coordinate system is generated for each radar antenna, a necessary storage capacity of a memory will become large. This is because an amount of data in the Cartesian coordinate system is greater than that of data in the polar coordinate system.

Japanese Patent No. 3990830 discloses a radar video composing device that aims to generate composite radar video signals even when radar antennas are installed at different places, and in addition, when transmission of radio waves and rotation of the radar antennas are asynchronous between the radar antennas. In this radar video composing device, an Rθ-XY conversion circuit converts video signals sent from radars A and B into Cartesian coordinate data items and stores them in a memory as image data items. An XY-Rθ conversion circuit adjusts the image data items of the radars A and B with respect to a center position of the radar A and converts the image data items into polar coordinate data items. Then, an output buffer control circuit 19 combines the polar coordinate data items of the respective radars A and B and outputs a combined data item.

However, the present inventor has found a problem in the technique disclosed in Japanese Patent No. 3990830, that as a Cartesian coordinate data item is generated for each radar antenna, in a manner similar to the technique disclosed in Japanese Patent No. 4917270, a necessary storage capacity of a memory will become large. The present inventor has found another problem in the technique disclosed in Japanese Patent No. 3990830 that as the data items are converted into the Cartesian coordinate data items, and then the Cartesian coordinate data items need to be converted again into the polar coordinate data items, this processing takes time.

SUMMARY

As described above, there is a problem that in the techniques disclosed in Japanese Patent Nos. 4917270 and 3990830, a necessary storage capacity will become large.

Other problems of the related art and new features of the present invention will become apparent from the following descriptions of the specification and attached drawings.

An aspect of the present invention is a semiconductor device that performs conversion on data items in a polar coordinate format each indicating a result of observation sent from a plurality of radars so that their axial positions will be the same, superimposes the plurality of data items on which the axial position conversion has been performed, and then converts superimposed data into data in a Cartesian coordinate format.

According to the above aspect, it is possible to reduce a necessary storage capacity.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, preferred embodiments will be described with reference to the drawings. Specific numeric values indicated in the following embodiments are merely illustrative for easier understanding of the embodiments, and unless otherwise particularly specified, the invention is not limited to them. In the following descriptions and drawings, matters obvious to those skilled in the art are omitted and simplified as appropriate for clarity of the descriptions.

First Embodiment

Figure 1:
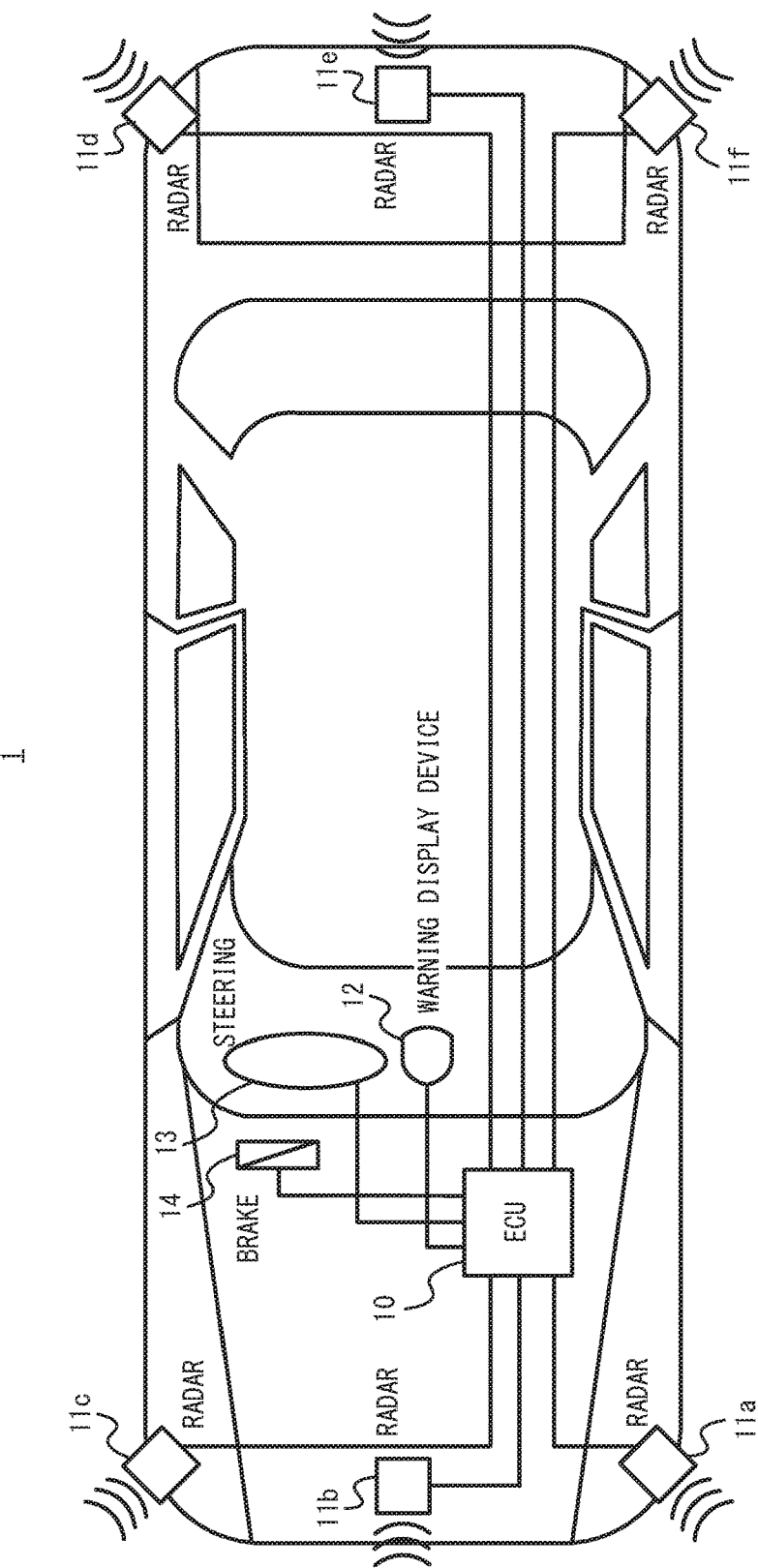
FIG. 1 is a block diagram showing a configuration of an on-board control system according to a first embodiment.

A first embodiment will be described first. A configuration of an on-board control system 1 according to the first embodiment will be described with reference to FIG. 1. As shown in FIG. 1, the on-board control system 1 includes an ECU (Electronic Controlling unit) 10, a plurality of radars 11a to 11f, a warning display device 12, a steering 13, and a brake 14. The on-board control system 1 is mounted on an automobile (hereinafter also referred to as a "vehicle").

The radars 11a to 11f are mounted outside the vehicle, and the parts 12 to 14 other than the radars 11a to 11f are mounted inside the vehicle. Although in FIG. 1, an example in which the number of the radars 11a to 11f is six is shown, the number of radars is not limited to this.

The ECU 10 controls each part (the steering 13, the brake 14 and the like) of the vehicle. The ECU 10 performs processing, such as recognition of a surrounding environment of the vehicle, determination of control contents of the vehicle according to the recognized surrounding environment, and control of the vehicle by the determined control contents according to data obtained from each of the radars 11a to 11f. The ECU 10 includes, as control modes for the ECU 10, a manual control mode in which the ECU 10 controls the vehicle according to an operation by a driver, and an automatic control mode in which the ECU 10 automatically controls the vehicle regardless of the operation by the driver.

For example, in the manual control mode, when the ECU 10 evaluates that the vehicle may come into contact with an object (an obstacle) according to the recognized surrounding environment when the driver continues to drive the vehicle, the ECU 10 switches its control mode to the automatic control mode. In the automatic control mode, the ECU 10 determines the control contents of the vehicle so that the vehicle avoids the object (e.g., the vehicle stops or the vehicle navigates around the object and runs). For example, when the driver of the vehicle manually switches the control mode of the ECU 10 from the manual control mode to the automatic control mode, the ECU 10 may determine the control contents of the vehicle according to the recognized surrounding environment so that, in the automatic control mode, the vehicle automatically travels to a destination which has been specified by the driver.

The ECU 10 may include a single part or may include a plurality of parts each responsible for different functions. When the ECU 10 includes a plurality of parts, the parts are connected in such a way that they can exchange information with each other. One of the parts is, for example, an MCU (Micro Control Unit), which will be described later.

The radars 11a to 11f are observation devices that observe surroundings of the vehicle. Each of the radars 11a to 11f observes an object present in the surroundings of the vehicle by electromagnetic waves such as light waves (e.g., infrared rays) and radio waves (e.g., millimeter waves). Each of the radars 11a to 11f generates a radar data item indicating a result of the observation and sends it to the ECU 10.

As shown in FIG. 1, the radars 11a to 11f are mounted on the vehicle. To be more specific, the radar 11a is mounted on the vehicle in order to observe a diagonally forward left direction of the vehicle. The radar 11b is mounted on the vehicle in order to observe a forward direction of the vehicle. The radar 11c is mounted on the vehicle in order to observe a diagonally forward right direction of the vehicle. The radar 11d is mounted on the vehicle in order to observe a diagonally backward right direction of the vehicle. The radar 11e is mounted on the vehicle in order to observe a backward direction of the vehicle. The radar 11f is mounted on the vehicle in order to observe a diagonally backward left direction of the vehicle. When a reference is made to the radars 11a to 11f collectively, they will be referred to as simply the "radar(s) 11".

The warning display device 12 is an output device that outputs warnings to an occupant of the vehicle. The output device is, for example, a display device that displays warning images. The display device is, for example, a liquid crystal panel, an organic EL panel, a plasma display panel or the like. Moreover, the output device is not limited to a device that displays (outputs) images and may be a light-emitting device that is lighted at the time of warning the occupant of the vehicle and outputs light or may be a speaker that outputs sound for warning the occupant of the vehicle. The light-emitting device is, for example, an LED light. For example, as described above, when the ECU 10 evaluates that the vehicle may come into contact with an object according to the recognized surrounding environment if the driver continues to drive the vehicle, the ECU 10 outputs a warning using the warning display device 12 and switches its control mode to the automatic control mode.

The steering 13 is a control device that changes a steering angle of tires of the vehicle according to an instruction from the ECU 10. The brake 14 is a control device that adjusts the brake according to an instruction from the ECU 10.

As described above, the on-board control system 1 functions as a sensor fusion system that observes conditions of the surroundings of the vehicles by the plurality of radars 11a to 11f and determines a direction in which the vehicle should travel.

Figure 2:
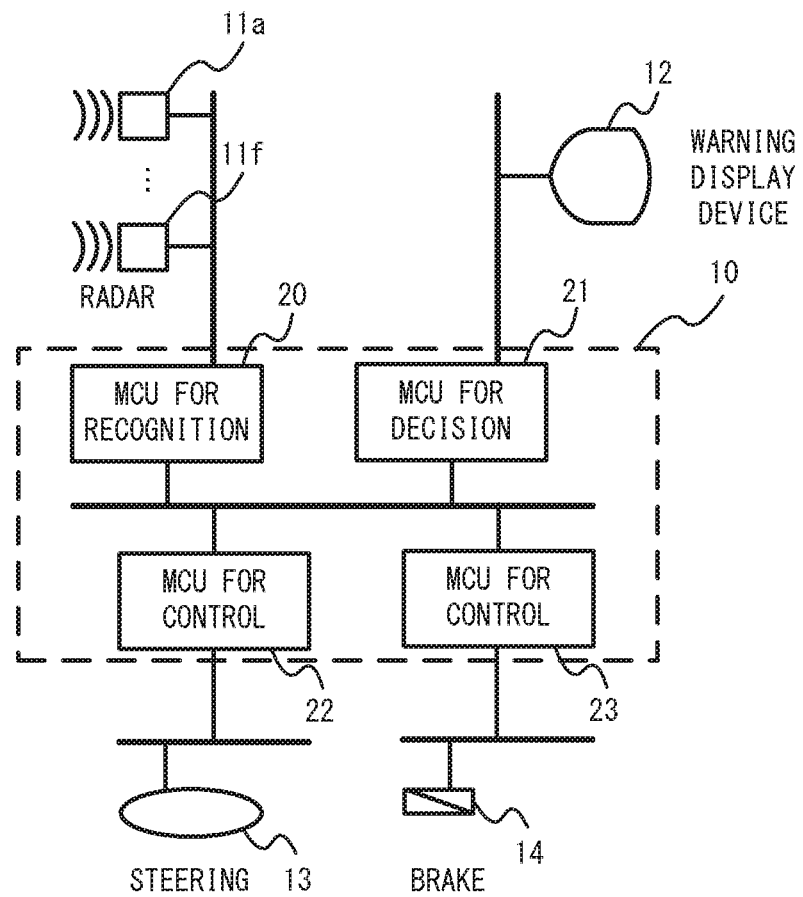
FIG. 2 is a block diagram showing a configuration of an ECU according to the first embodiment.

Next, a configuration of the ECU 10 according to the first embodiment will be described with reference to FIG. 2. As shown in FIG. 2, the ECU 10 includes an MCU for recognition 20, an MCU for decision 21, and MCUs for control 22 and 23.

The MCU for recognition 20 is connected to the plurality of radars 11a to 11f via a dedicated bus. The MCU for decision 21 is connected to the warning display device 12 via a dedicated bus. The MCU for control 22 is connected to the steering 13 via a dedicated bus. The MCU for control 23 is connected to the brake 14 via a dedicated bus. Note that in FIG. 2, although an example in which two MCUs for control 22 and 23 are included is shown, the number of the MCUs for control is not limited to this. For example, the ECU 10 may include only one MCU for control that controls both of the steering 13 and the brake 14. In this case, this MCU for control is connected to each of the steering 13 and the brake 14 via dedicated buses, respectively.

The MCU for recognition 20 recognizes the surrounding environment of the vehicle according to the radar data items received from the respective radars 11a to 11f. More specifically, the MCU for recognition 20 recognizes an object present in the surroundings of the vehicle as the surrounding environment of the vehicle. At this time, the MCU for recognition 20 generates data indicating an existence probability of the object at each position in the surroundings of the vehicle as data indicating the recognized surrounding environment. Then, the MCU for recognition 20 sends the generated data indicating the surrounding environment to the MCU for decision 21.

The MCU for decision 21 determines the control contents of the vehicle according to the surrounding environment indicated by the data received from the MCU for recognition 20. For example, as mentioned above, the MCU for decision 21 determines the control contents of the vehicle so that the vehicle avoids an object. The MCU for decision 21 generates control information indicating the determined control contents and sends it to both of the MCUs for control 22 and 23.

The MCUs for control 22 and 23 control the vehicle in accordance with the control contents indicated by the control information based on the control information received from the MCU for control 21. More specifically, the MCU for control 22 controls the steering 13 in accordance with the control contents indicated by the control information. Further, the MCU for control 23 controls the brake 14 in accordance with the control contents indicated by the control information.

Figure 3:
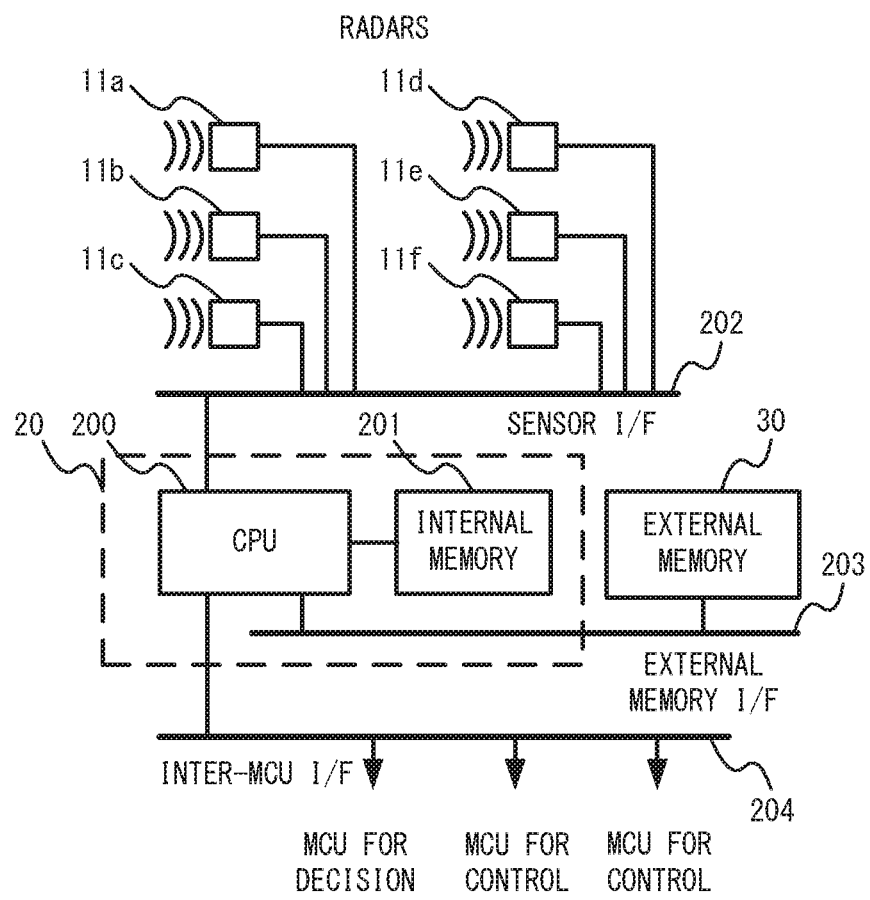
FIG. 3 is a block diagram showing a configuration of an MCU for recognition according to the first embodiment.

Next, a configuration of the MCU for recognition 20 according to the first embodiment will be described with reference to FIG. 3. As shown in FIG. 3, the MCU for recognition 20 includes a CPU (Central Processing Unit) 200, an internal memory 201, a sensor I/F 202, an external memory I/F 203, and an inter-MCU I/F 204. The on-board control system 1 includes an external memory 30.

The CPU 200 is an operation device that executes various processing in order to achieve functions as the MCU for recognition 20 according to information stored in the internal memory 201 and the external memory 30.

The internal memory 201 is connected to the CPU 200. The internal memory 201 is a storage device that stores various information necessary for the CPU 200 to execute processing. The internal memory 201 is, for example, a memory that can be accessed at a high speed such as an SRAM (Static Random Access Memory) or the like.

The sensor I/F 202 is a bus that connects the plurality of radars 11$a$ to 11$f$ to the CPU 200. The external memory I/F 203 is a bus that connects the external memory 30 to the CPU 200. The inter-MCU I/F 204 is a bus that connects other MCUs 21 to 23 to the CPU 200. Note that these I/Fs 202 to 204 may be dedicated buses or may be general-purpose buses compliant with the standard such as CAN (Controller Area Network), Ethernet (registered trademark) or the like. The I/Fs 202 to 204 may not be physically separated buses, and a single bus may be switched in a time-sharing manner to be used as the I/Fs 202 to 204.

The external memory 30 is a storage device that stores various information necessary for the CPU 200 to execute processing. The external memory 30 is, for example, a large capacity memory such as a DRAM (Dynamic Random Access Memory) or a non-volatile memory such as a flash memory.

Figure 4:
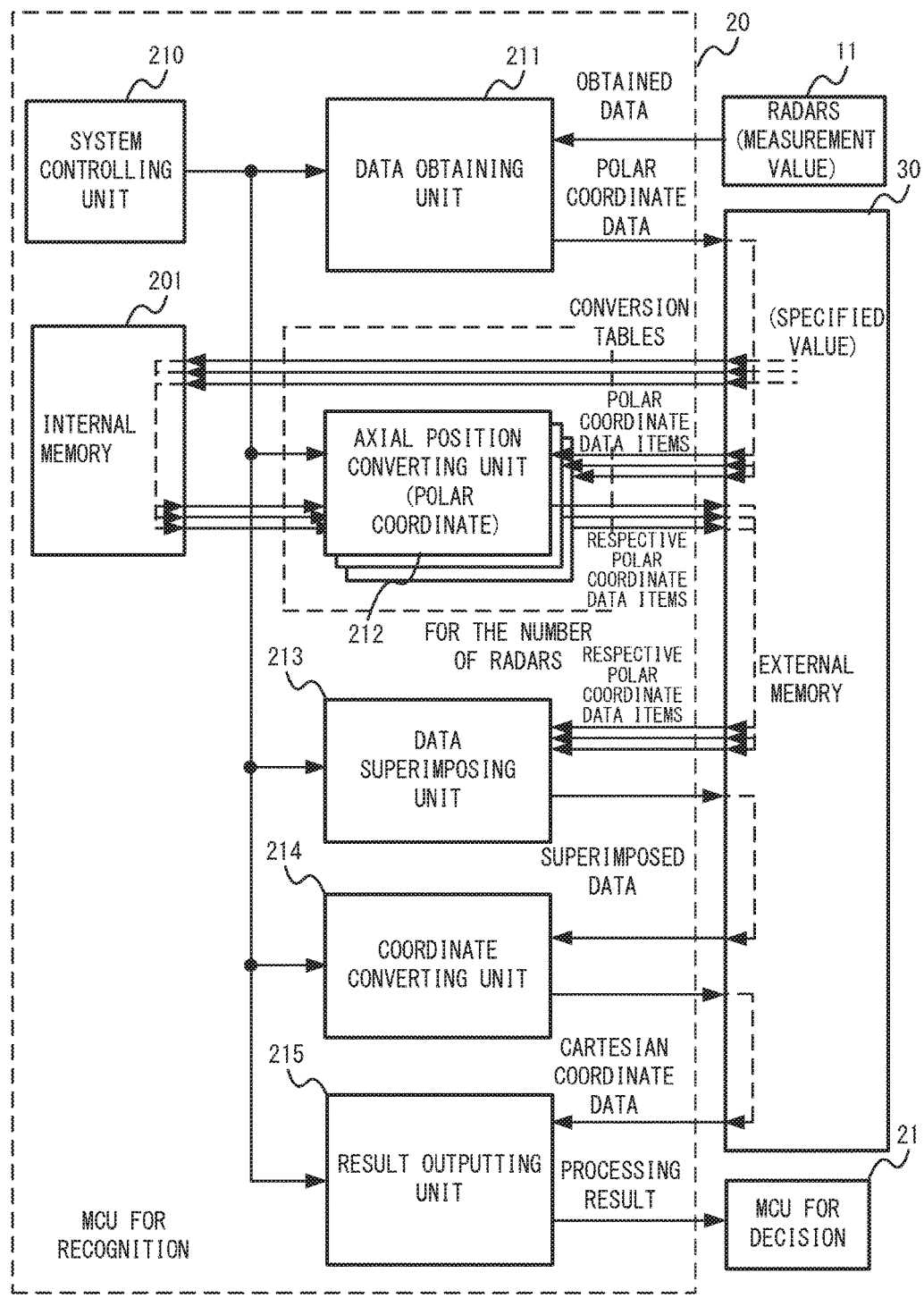
FIG. 4 is a functional block diagram of the MCU for recognition according to the first embodiment.

Next, functional blocks of the MCU for recognition 20 according to the first embodiment will be described with reference to FIG. 4. As shown in FIG. 4, the MCU for recognition 20 includes a system controlling unit 210, a data obtaining unit 211, a plurality of axial position converting units 212, a data superimposing unit 213, a coordinate converting unit 214, and a result outputting unit 215. These units 210 to 215 are included in the CPU 200.

The system controlling unit 210 controls the data obtaining unit 211, the plurality of axial position converting units 212, the data superimposing unit 213, the coordinate converting unit 214, and the result outputting unit 215. For example, the system controlling unit 210 operates each of the units 211 to 215 in order of the data obtaining unit 211, the plurality of axial position converting units 212, the data superimposing unit 213, the coordinate converting unit 214, and the result outputting unit 215 so that data will be processed in this order.

Figure 5:
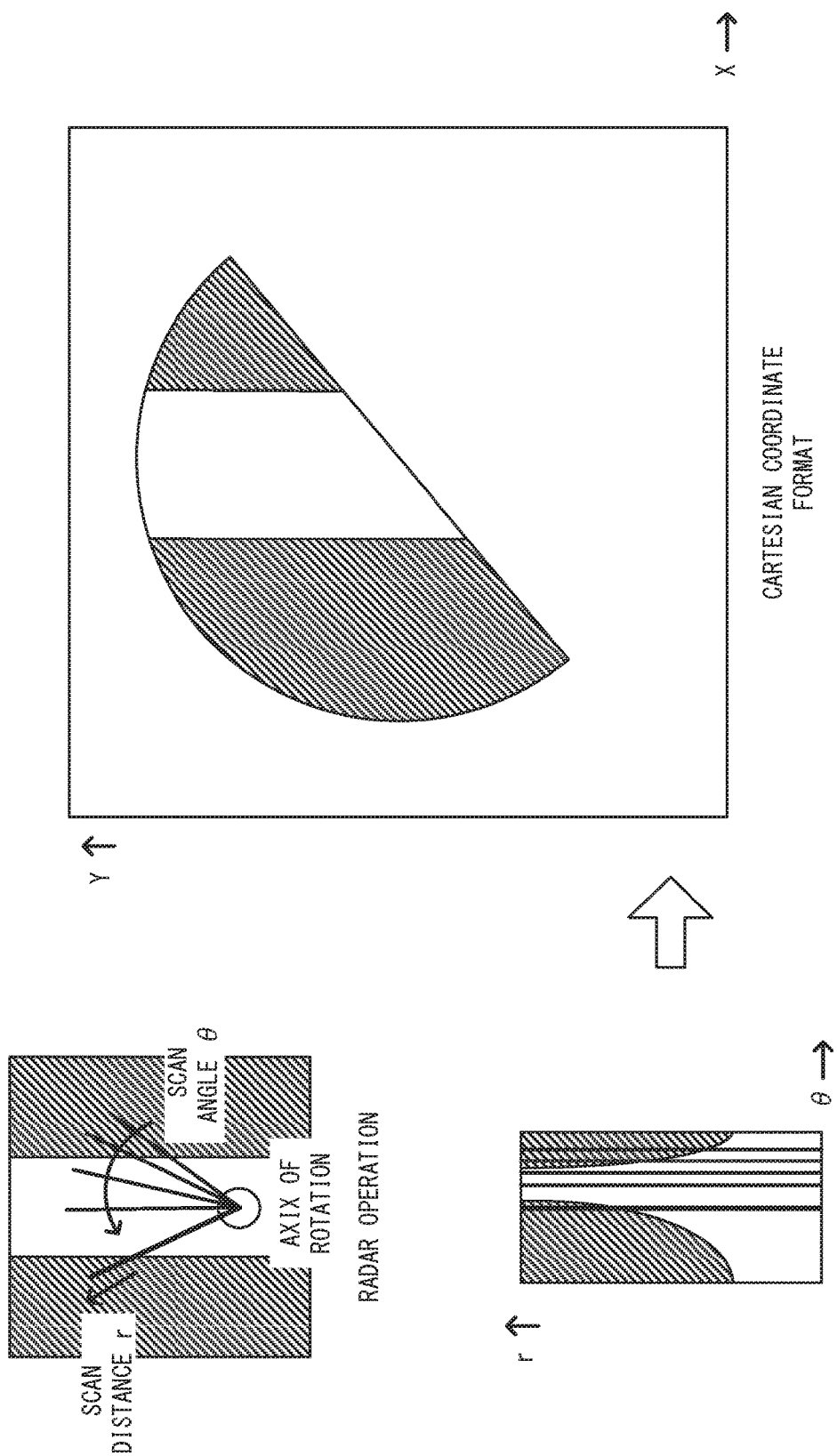
FIG. 5 is a drawing showing a data item in a polar coordinate format and a data item in a Cartesian coordinate format.

The data obtaining unit 211 obtains the radar data items sent from the respective radars 11$a$ to 11$f$ via the sensor I/F 202. The data obtaining unit 211 performs processing on the obtained radar data item, and as shown in FIG. 5, generates a data item in a polar coordinate format which is a two-dimensional data item in which an axis of rotation of the radar 11 is used as a reference, a distance direction is an r-axis, and a counter-clockwise angular direction is a θ-axis. Hereinafter, this data item will also be referred to as a "polar coordinate data item". The polar coordinate data item indicates an existence probability of an object in each coordinate in a two-dimensional space in which the distance direction and the angular direction of the radar 11 are used as respective axes. The data obtaining unit 211 stores the generated polar coordinate data item in the external memory 30 via the external memory I/F 203. Note that the polar coordinate data items generated from the radar data items sent from the respective radars 11$a$ to 11$f$ are stored in the external memory 30. In other words, the polar coordinate data items, the number of which being the same as the number of the radars 11$a$ to 11$f$, are stored in the external memory 30.

Each of the plurality of axial position converting units 212 uses a conversion table corresponding to one of the radars 11$a$ to 11$f$ to perform axial position conversion on the polar coordinate data item corresponding to one of the radars 11$a$ to 11$f$. That is, the number of the plurality of axial position converting units 212 is the same as the number of the radars 11$a$ to 11$f$. Each of the plurality of axial position converting units 212 corresponds to one of the radars 11$a$ to 11$f$ and processes the polar coordinate data item that is generated according to the radar data item from the corresponding radar 11. Note that the axial position conversion is to convert the polar coordinate data item in which the axis of rotation of the radar 11 is used as an origin into a polar coordinate data item in which a center of the vehicle is used as the origin. Each of the plurality of axial position converting units 212 stores the converted polar coordinate data item in the external memory 30 via the external memory I/F 203.

The plurality of conversion tables are previously stored in the external memory 30. The plurality of axial position converting units 212 obtain plurality of respective conversion tables from the external memory 30 via the external memory I/F 203 and stores them in the internal memory 201. The conversion tables may be stored in the internal memory 201 when startup of the on-board control system 1 is completed or immediately before the plurality of axial position converting units 212 execute the axial position conversion. The plurality of axial position converting units 212 use the plurality of conversion tables stored, respectively, in the internal memory 201 to perform the axial position conversion.

The conversion table associates a distance r and an angle θ before the conversion with a distance r and an angle θ after the conversion for each coordinate in which the polar coordinate data item before the conversion indicates an existence probability of an object in a polar coordinate system. In other words, the conversion table associates respective coordinates when the axes of rotation of the radars 11 are used as the origins with respective coordinates when the center of the vehicle is used as the origin. The axial position converting unit 212 generates the converted polar coordinate data item according to this conversion table so that a value of the coordinate indicated by the polar coordinate data item before the conversion indicates a value of a coordinate at the distance r and the angle θ after the conversion corresponding respectively to the distance r and the angle θ at the coordinate.

The conversion table may be information indicating the distance r and the angle θ before the conversion and the distance r and the angle θ after the conversion or may be information of a function that outputs the distance r and the angle θ after the conversion when the distance r and the angle θ before the conversion are input.

The data superimposing unit 213 superimposes all the polar coordinate data items stored in the external memory 30 in order to generate superimposed data. The data superimposing unit 213 stores the generated superimposed data in the external memory 30 via the external memory I/F 203.

As shown in FIG. 5, the coordinate converting unit 214 generates, from the superimposed data in the polar coordinate format, data in a Cartesian coordinate format which is two-dimensional data in which the center of the vehicle is used as a reference, a horizontal direction is an x-axis, and a vertical direction is a Y-axis. Hereinafter, this data will also be referred to as "Cartesian coordinate data". The polar coordinate data item indicates an existence probability of an object in each coordinate in a two-dimensional space in which the horizontal direction and the vertical direction of the vehicle are used as respective axes. The coordinate converting unit 214 stores the generated Cartesian coordinate data in the external memory 30 via the external memory I/F 203.

The result outputting unit 215 obtains the Cartesian coordinate data stored in the external memory 30 and outputs it to the MCU for decision 21 via the inter-MCU I/F 204. The MCU for decision 21 recognizes the existence probability of the object in the surroundings of the vehicle, searches for a route the vehicle will travel, and determines the control contents of the vehicle according to the Cartesian coordinate data output from the result outputting unit 215.

Next, a relationship between the polar coordinate data items and the Cartesian coordinate data generated by the MCU for recognition 20 according to the first embodiment will be described with reference to FIG. 6.

In the first embodiment, as described above, the MCU for recognition 20 adjusts the axial positions of the plurality of polar coordinate data items corresponding to the respective radars 11a to 11f, superimposes the polar coordinate data items, and then converts the superimposed polar coordinate data into Cartesian coordinate data. Therefore, as shown in FIG. 6, a plurality of Cartesian coordinate data items are generated from the radar data items sent from the radars 11a to 11f, respectively, the axial positions of those data items are adjusted, and thus the Cartesian coordinate data that is equivalent to the superimposed data can be obtained.

Figure 6:
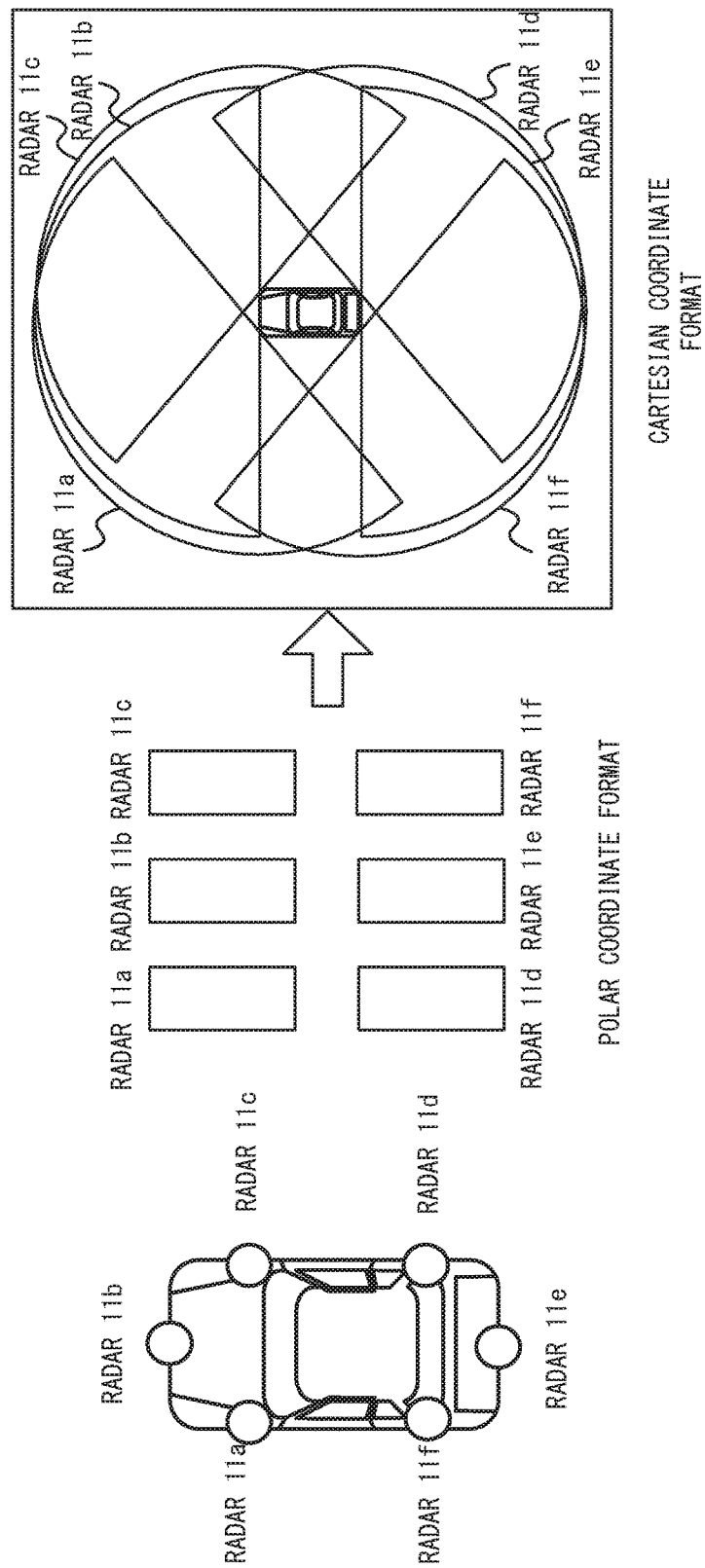
FIG. 6 is a drawing showing a relationship between polar coordinate data items and Cartesian coordinate data generated by the MCU for recognition according to the first embodiment.

Note that FIG. 6 shows an example in which a range that can be observed by each of the radars 11a to 11f in the angular direction θ is zero to 180 degrees (a center of an observation direction of the radars 11a to 11f shall be 90 degrees). Accordingly, the observation ranges of the radars 11a to 11f are in shapes of semicircles that have radii of a maximum value of the distance r. Thus, data obtained by superimposing the observation ranges is generated as the Cartesian coordinate data.

Figure 7:
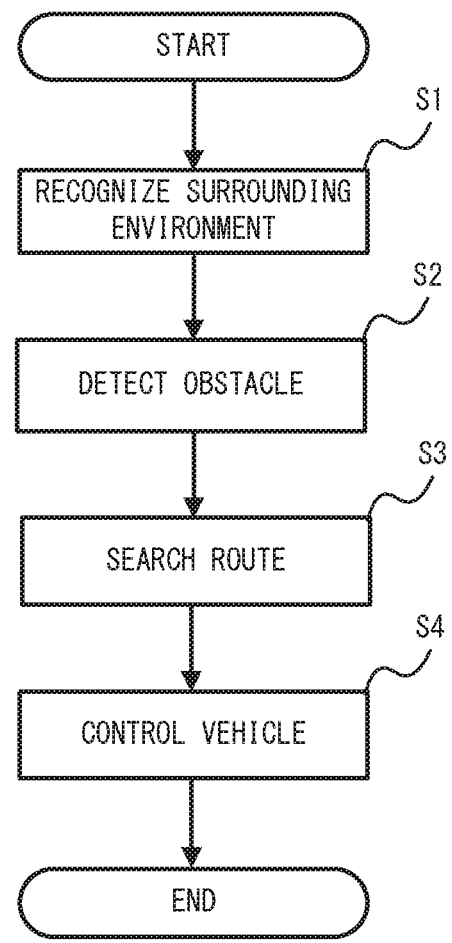
FIG. 7 is a flowchart showing an operation of an on-board control system according to the first embodiment.

Next, an operation of the on-board control system 1 according to the first embodiment will be described with reference to FIG. 7. FIG. 7 is a flowchart showing an operation of the on-board control system 1 according to the first embodiment.

The MCU for recognition 20 creates a map (hereinafter also referred to as a "surrounding environment map") obtained by quantifying the existence probabilities of an obstacle (object) at respective positions around the vehicle in surrounding environment recognition processing according to the radar data items received respectively from the plurality of radars 11a to 11f (S1). This surrounding environment map corresponds to the above Cartesian coordinate data. The MCU for recognition 20 sends the generated surrounding environment map to the MCU for decision 21 via the inter-MCU I/F 204.

The MCU for decision 21 detects a region having an existence probability greater than a threshold and having a size greater than or equal to a certain size as an obstacle in obstacle detection processing on the surrounding environment map received from the MCU for recognition 20 (S2). The MCU for decision 21 selects a route for the vehicle that enables the vehicle to avoid the obstacle from a plurality of candidate routes which could be taken by the vehicle in route search processing (S3). The MCU for decision 21 generates control information so that the vehicle travels the selected route and sends it to both of the MCUs for control 22 and 23 via the inter-MCU I/F 204. This control information includes numeric values of movement of the vehicle.

The MCUs for control 22 and 23 control the vehicle according to the control information received from the MCU for decision 21 in vehicle control processing (S4).

Figure 8:
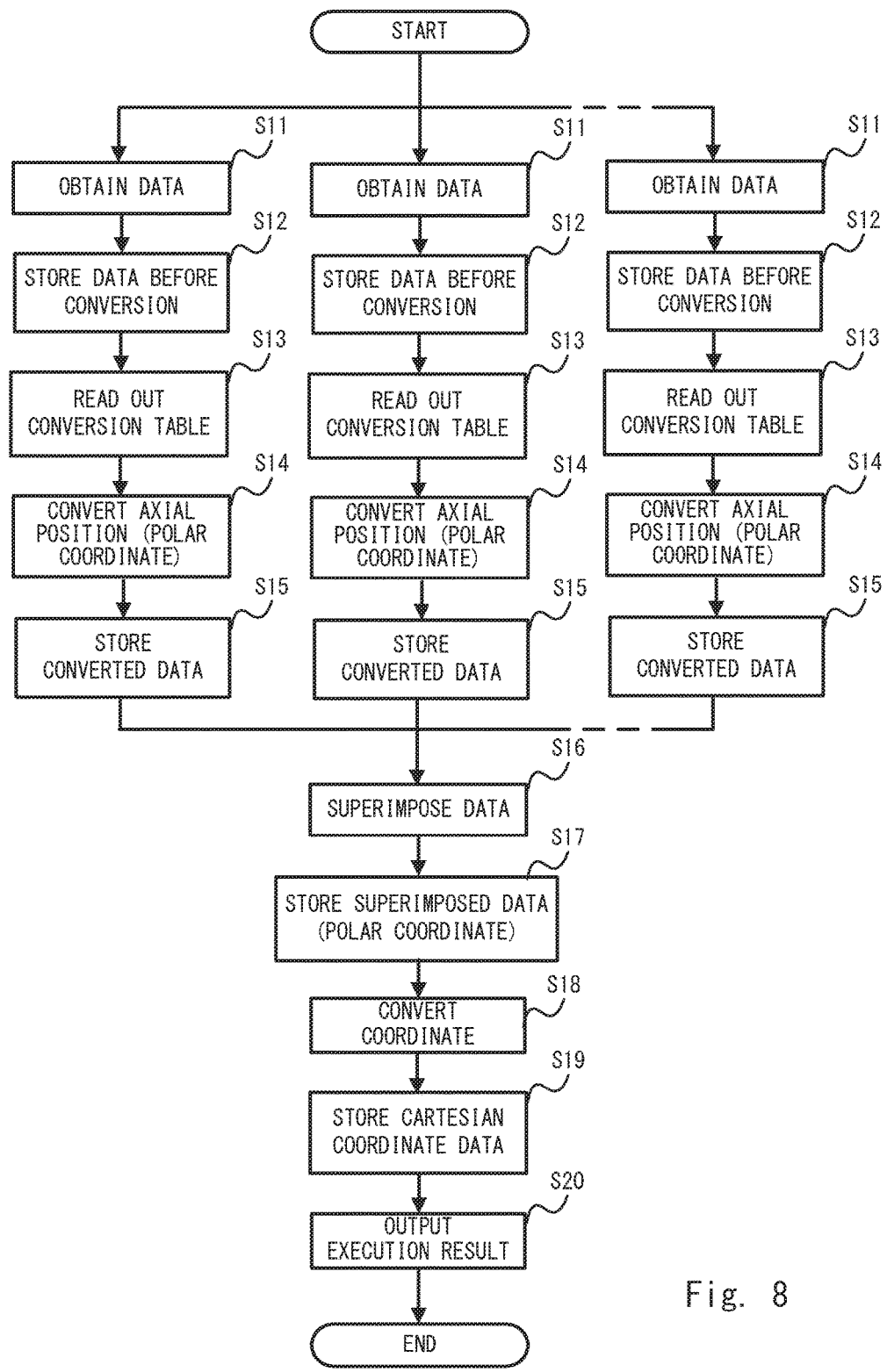
FIG. 8 is a flowchart showing an operation of surrounding environment recognition by the MCU for recognition according to the first embodiment.

Next, an operation of the surrounding environment recognition (S1) by the MCU for recognition 20 according to the first embodiment will be described with reference to FIG. 8. FIG. 8 is a flowchart showing the operation of the surrounding environment recognition (S1) by the MCU for recognition 20 according to the first embodiment. Note that as operations after S1, which are the obstacle detection (S2), the route search (S3), and the vehicle control (S4) can use arbitrary algorithms, these operations will not be described in detail.

The data obtaining unit 211 of the MCU for recognition 20 obtains the radar data items sent respectively from the radars 11a to 11f (S11). The radar data items are input to the data obtaining unit 211 in order from the one having the smallest distance r from the radar to the vehicle to the one having the greatest distance r from the radar to the vehicle for a certain angle $\theta_j$. When all the radar data items for the certain angle $\theta_j$ are input, radar data items for the next angle $\theta_{j+1}$ are input to the data obtaining unit 211 in a manner similar to that above. When the radar data items are input for the angles one by one from zero degree to 180 degrees while switching the distance one by one from zero to 400, the polar coordinate data will become two-dimensional data having a size of 180×400. When the distances are quantized by a certain unit of distance (e.g., every 10 cm), as mentioned above, if a maximum distance is 400, information about 40 m ahead can be obtained.

Values of respective coordinates indicated by the polar coordinate data items indicate the existence probabilities of the object obtained by the radars 11. The existence probabilities are, for example, values obtained by quantizing probabilities from 0.0 (0%) to 1.0 (100%) by 256 steps. The values of the coordinates indicated by the polar coordinate data items are, for example, calculated by the following expression (1), which is a probability density function of normal distribution. In the expression (1), r represents the distance from the radar 11 to the vehicle as described above, and μ is a distance from the radar 11 to a position where electromagnetic waves emitted from the radar 11 are reflected (a position where the radar 11 detects the object). Further, σ is determined as a parameter that adjusts a degree of a change in which f(r) becomes smaller than a maximum value as r becomes further away from μ. The smaller the value of σ, the greater the change will be, and the greater the maximum value will be. Conversely, the greater the value of σ, the smaller the change will be, and the smaller the maximum value will be. In practice, a value within a range of 0.4 to 0.8 is used for the maximum value.

$$f(r)=1/\sqrt{(2\pi^2)}\exp(-(r-\mu)^2/2\sigma^2) \qquad (1)$$

Therefore, at the coordinate with the distance p where the object is detected by the radar 11, such a polar coordinate data item can be obtained that the existence probability of the object becomes the maximum value, and the existence probability of the object is gradually reduced as it becomes further away from the coordinate with the distance p.

The data obtaining unit 211 stores the polar coordinate data items corresponding respectively to the radars 11a to 11f in the external memory 30 (S12).

Next, each of the axial position converting units 212 of the MCU for recognition 20 reads out the corresponding conversion table from the external memory 30 and stores it in the internal memory 201 (S13). The axial position converting units 212 perform the axial position conversion according to the respective conversion tables stored by the plurality of axis position converting units 212 in the internal memory 201. In the axial position conversion, a reference position (r=0 and θ=90) of the polar coordinate data item is moved from the axes of rotation of the respective radars 11a to 11f to the center of the vehicle in order to enable the polar coordinate data items to be superimposed (S14).

In general, when certain points X and Y in a Cartesian coordinate space are represented by r and θ in a polar coordinate space, using trigonometric functions, the points are expressed by X=r cos θ and Y=r sin θ. Conversely, the points r and θ in the polar coordinate space can be expressed by r=√(X²+Y²) and θ=a tan(Y/X) using X and Y in the Cartesian coordinate space. The data items at the respective coordinates before and after the conversion correspond one-to-one. Conversion expressions that move the respective coordinate points in the Cartesian coordinate space are X'=X+a and Y'=Y+b. That is, when the axial position conversion is performed in the Cartesian coordinate space, the respective coordinate points move in parallel.

However, when the same conversion is represented in the polar coordinate space according to the above conversion expressions, the conversion will be nonlinear. On the other hand, in the first embodiment, the converted coordinates can be calculated from the coordinates before the conversion in the polar coordinate space by using the conversion tables that associate the respective coordinates in the polar coordinate system before the conversion with the converted respective coordinates in the polar coordinate system.

Figure 9:
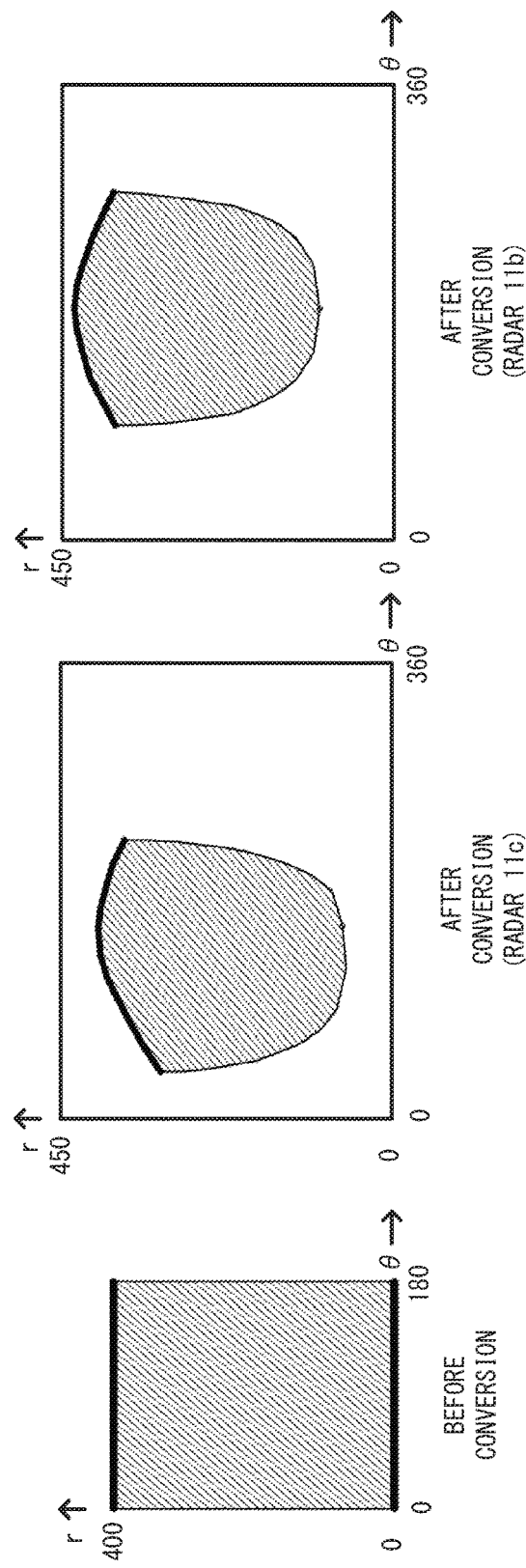
FIG. 9 is a drawing showing a polar coordinate data item before and after axial position conversion according to the first embodiment.

FIG. 9 shows a correspondence relationship of the polar coordinate data items before and after the conversion. As indicated by "BEFORE CONVERSION" in FIG. 9, the polar coordinate data items corresponding to the respective radars 11a to 11f are data of 180×400 indicating existence probabilities of an object in the distance from zero to 400 at angles from zero degree to 180 degrees.

Moreover, a memory space necessary for the converted polar coordinate data items is uniquely determined according to positions of the radars 11 from the center of the vehicle. For example, while the polar coordinate space is 180×400 as mentioned above, when the axes of rotation of all radars 11a to 11f are within a range that is at a distance of 50 from the center of the vehicle, all the converted polar coordinate data items corresponding to the radars 11a to 11f can be expressed in memory spaces of 360×450 each having a length of 360 (degrees) in the angular direction and 450 in the distance direction.

In FIG. 9, a range in which a converted polar coordinate data item corresponding to the radar 11c indicates an existence probability of an object in the polar coordinate system ("AFTER CONVERSION (RADAR 11c)" in FIG. 9) and a range in which a converted polar coordinate data item corresponding to the radar 11b indicates an existence probability of an object in the polar coordinate system ("AFTER CONVERSION (RADAR 11b) in FIG. 9) are shown as examples. In FIG. 6, when the backward direction of the vehicle is zero degree (=360 degrees), as shown in FIG. 9, the converted polar coordinate data item corresponding to the radar 11c and the converted polar coordinate data item corresponding to the radar 11b are generated. Shaded parts of the converted polar coordinate data items correspond to the polar coordinate data item before the conversion. Upper thick lines in the converted polar coordinate data item correspond to coordinates where r=400 in the range in which the polar coordinate data item before the conversion indicates the existence probability of the object in the polar coordinate system. Coordinates where r=0 in the range in which the polar coordinate data item before the conversion indicate the existence probability of the object in the polar coordinate system are aggregated to one point.

As shown in FIG. 6, as the range observed by the radar 11c is the diagonally forward right direction of the vehicle, in the angular direction, the part corresponding to the polar coordinate data item before the conversion becomes closer to zero degree than 180 degrees, which is the center of the vehicle. Further, as shown in FIG. 6, as the range observed by the radar 11b is the forward direction of the vehicle, in the angular direction, the part corresponding to the polar coordinate data item before the conversion will be a part that is line symmetric with respect to 180 degrees, which is the center of the vehicle.

That is, a plurality of converted data items corresponding to the plurality of radars 11a to 11f, respectively, differ in their contents from each other so that the axial positions of the polar coordinate data items will be the same according to the position of the vehicle on which the plurality of radars 11a to 11f are mounted. Then, the polar coordinate data items generated according to the radar data items from the plurality of radars 11a to 11f, respectively, that are installed at different positions can be converted in such a way that their axial positions will be the same.

Note that the axial position conversion unit 212 sets a predetermined existence probability for a part in which the converted polar coordinate data item does not correspond to the polar coordinate data before the conversion. As such a part is a region not observed by the radar 11, the axial position converting unit 212 sets, for example, 0.5 (50%) (an intermediate value between present and absent) for the existence probability of the object.

Each of the axial position converting units 212 reads out the polar coordinate data item before the conversion from the external memory 30 and stores the converted polar coordinate data item in a region different from the region where the polar coordinate data before the conversion is stored in the external memory 30 (S15). As the axial position conversion aligns all the polar coordinate data items with the coordinates in which the center of the vehicle is used as the origin, the polar coordinate data items can be superimposed, which will be described later.

After all the axial position converting units 212 have performed the axial position conversion on the polar coordinate items corresponding to all the radars 11a to 11f, the data superimposing unit 213 of the MCU for recognition 20 superimposes the polar coordinate data items (S16). As to the superimposition, values of coordinates at the same distance r and the same angle θ in the polar coordinate data items are superimposed at a predetermined proportion. For example, when a result S that is obtained by superimposing values A and B is calculated, the following expressions (2) and (3) that are commonly known based on the Bayes' theorem can be used. The data superimposing unit 213 stores the superimposed data in the external memory 30 (S17).

$$s = A/(1-A) \times B/(1-B) \qquad (2)$$

$$S = s/(1+s) \qquad (3)$$

According to these expressions (2) and (3), when the existence probabilities at the same coordinate indicated by the converted polar coordinate data items are lower than 50%, the existence probability of the coordinate indicated by the superimposed data will become lower than the existence probabilities at the same coordinate. Further, when the existence probabilities at the same coordinate indicated by the converted polar coordinate data item are greater than 50%, the existence probability of the coordinate indicated by the superimposed data will become greater than any of the existence probabilities at the same coordinate. Thus, the existence probability indicated by the superimposed data can be adjusted to be a more appropriate existence probability that comprehensively takes into consideration the values indicated by the polar coordinate data items to be superimposed. That is, in the polar coordinate data items, frequency in which the existence probabilities near the intermediate value (50%) between presence and absence of the object are indicated is reduced, and thus enabling the MCU for decision 21 to easily evaluate a travelling route.

In the above example, 50% is used as a reference, and when the existence probabilities at the same coordinate indicated by the polar coordinate data items are lower than the reference, the existence probability of the coordinate indicated by the superimposed data is reduced, while when the existence probabilities at the same coordinate indicated by the polar coordinate data items are greater than the reference, the existence probability of the coordinate indicated by the superimposed data is increased. However, the value used as the reference may be 50% or other predetermined values. For example, instead of using the expressions (2) and (3), and an expression that uses a predetermined value as the reference, reduces the existence probability of the coordinate indicated by the superimposed data when the existence probabilities of the same coordinate indicated by the polar coordinate data items are lower than the reference, and increases the existence probability of the coordinate indicated by the superimposed data when the existence probabilities of the same coordinate indicated by the polar coordinate data items are greater than the reference may be used.

Note that while the above expressions (2) and (3) are used to superimpose two data items, in the first embodiment, six polar coordinate data items need to be superimposed. However, when two polar coordinate data items (which may be data items obtained by superimposing two or more polar coordinate data items) according to the above expressions (2) and (3) are superimposed five times, the superimposed data obtained by superimposing six polar coordinate data items can be obtained.

The coordinate converting unit 214 of the MCU for recognition 20 converts the superimposed data from data in the polar coordinate format into data in the Cartesian coordinate format (S18). As for this conversion, the above-mentioned general conversion expression for converting the above polar coordinate data item indicated by the distance r and the angle θ into the Cartesian coordinate data indicated by the horizontal direction X and the vertical direction Y can be used. The coordinate conversion unit 214 stores the converted Cartesian coordinate data in the external memory 30 (S19). As this Cartesian coordinate data is obtained by superimposing all data items from the respective radars 11a to 11f, it is not necessary to reserve a memory space for the number of the data items, which is the same as the number of the radars 11a to 11f, and only a memory space for one data item may be reserved. Note that while the memory space necessary to be reserved in the external memory 30 for storing the polar coordinate data items is 360×450 as mentioned above, a size of the memory space necessary to be reserved in the external memory 30 in order to store this Cartesian coordinate data is 900×900, in which 450 is reserved respectively in the horizontal and vertical directions with respect to the center of the vehicle as a reference.

Lastly, the result outputting unit 215 of the MCU for recognition 20 reads out the Cartesian coordinate data from the external memory 30 and outputs it to the MCU for decision 21 via the inter-MCU I/F 204 (S20).

These processes are performed by the CPU 200 executing software (a program(s)). That is, this software includes instructions for causing the above CPU 200 to execute various processing. This software is, for example, previously stored in the external memory 30 and executed when the CPU 200 loads the software from the external memory 30 into the internal memory 201.

Note that although a single-core processor may be employed as the above CPU 200, a multi-core processor on which CPU cores for the number of radars 11a to 11f are mounted may be employed, and the CPU cores may execute the processing of the steps S11 to S15 at the same time in parallel. By doing so, processing can be executed in a shorter time than when a single-core processor is employed.

As described above, the first embodiment is characterized by the operation in the surrounding environment recognition. In the first embodiment, the data obtaining unit 211 obtains the plurality of data items indicating observation results from the plurality of radars 11a to 11f, respectively, that observe surroundings, converts the obtained data items into data in the polar coordinate format, and stores the converted data items in the storage unit (the external memory 30). The axial position converting units 212 perform conversion on the plurality of data items in the polar coordinate format, respectively, that are stored in the storage unit so that their axial positions will be the same to generate the plurality of data items on which the axial position conversion has been performed and stores them in the storage unit. The data superimposing unit 213 superimposes the plurality of data items on which the axial position conversion has been performed to generate the superimposed data. Then, the coordinate converting unit 214 converts the superimposed data into data in the Cartesian coordinate format. It is therefore not necessary to prepare a plurality of storage capacities for storing the Cartesian coordinate data, an amount of which is greater than that of the polar coordinate data, and thus a necessary storage capacity can be reduced, which will be described below.

When the values of the respective coordinates are quantized to indicate the existence probabilities of the object from 0 to 1.0 by 256 steps from zero to 255, the existence probabilities can be expressed by one byte each. The necessary storage capacity of the external memory 30 at this time is six regions each having 180×400 bytes for storing polar coordinate data items before the conversion corresponding to the respective radars 11a to 11c, six regions each having 360×450 bytes for storing the converted polar coordinate data items (one of these regions is also a region that stores the superimposed data), and one region having 900× 900 bytes for storing the Cartesian coordinate data, which will be a total of 2,214,000 bytes.

On the other hand, a necessary capacity when processing is performed by the technique disclosed in Japanese Patent No. 4917270 is six regions each having 180×400 bytes for storing polar coordinate data items before the conversion corresponding to the respective radars 11a to 11f and six regions each having 900×900 bytes for storing the converted Cartesian coordinates (one of these regions is also a region that stores the superimposed data), which will be a total of 5,292,000 bytes. That is, according to the first embodiment, a necessary storage capacity of a memory can be reduced by as much as 58% in comparison to the example according to the above related art.

Second Embodiment

Next, a second embodiment will be described. In the following descriptions of the second embodiment, the same contents as those explained in the first embodiment are denoted by the same signs, and descriptions thereof will be omitted as appropriate. As configurations of the on-board control system 1 and the ECU 10 according to the second embodiment are the same as those of the on-board control system 1 and the ECU 10 according to the first embodiment shown in FIGS. 1 and 2, descriptions thereof will be omitted.

Figure 10:
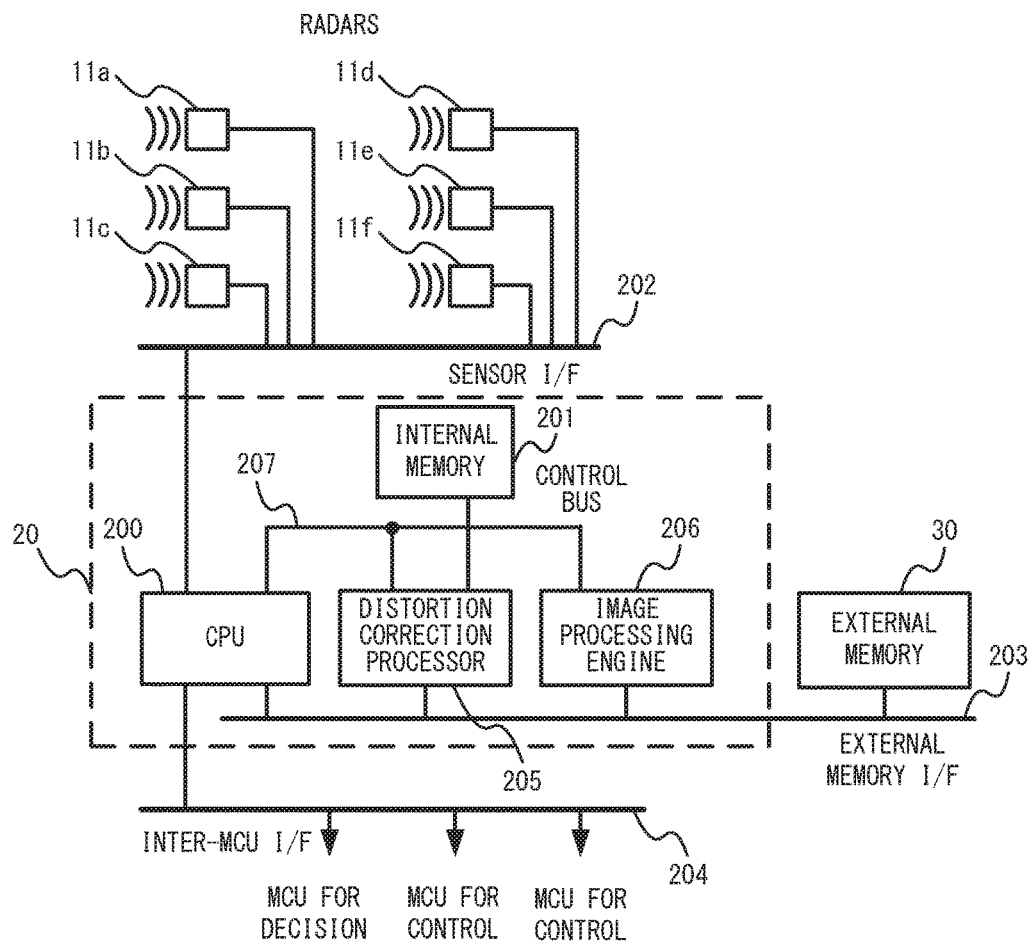
FIG. 10 is a block diagram showing a configuration of an MCU for recognition according to a second embodiment.

Next, a configuration of the MCU for recognition 20 according to the second embodiment will be described with reference to FIG. 10. As shown in FIG. 10, the MCU for recognition 20 has the same configuration as that of the MCU for recognition 20 according to the first embodiment and further includes a distortion correction processor 205, an image processing engine 206, and a control bus 207.

The distortion correction processor 205 is a circuit on which hardware dedicated for performing distortion correction is mounted. In the second embodiment, the distortion correction processor 205 uses the hardware dedicated for performing the distortion correction to perform the above axial position conversion and coordinate conversion. In the second embodiment, the internal memory 201 is connected to the distortion correction processor 205.

The image processing engine 206 is a circuit on which hardware dedicated for performing image processing such as superimposing of images is mounted. In the second embodiment, the image processing engine 206 uses the hardware dedicated for performing the image processing to perform the above data superimposition.

The CPU 200 is connected to the distortion correction processor 205 and the image processing engine 206 via the control bus 207 in order to control the distortion correction processor 205 and the image processing engine 206. As the plurality of radars 11a to 11f, the CPU 200, the sensor I/F 202, the external memory I/F 203, and the inter-MCU I/F 204 are the same as those described in the first embodiment, descriptions thereof will be omitted.

As the functional blocks of the MCU for recognition 20 according to the second embodiment are the same as those of the MCU for recognition 20 according to the first embodiment shown in FIG. 4, descriptions thereof will be omitted. However, in the second embodiment, unlike the first embodiment, the axial position converting unit 212 and the coordinate converting unit 214 are included in the distortion correction processor 205, and the data superimposing unit 213 is included in the image processing engine 206, which will be described later.

Figure 11:
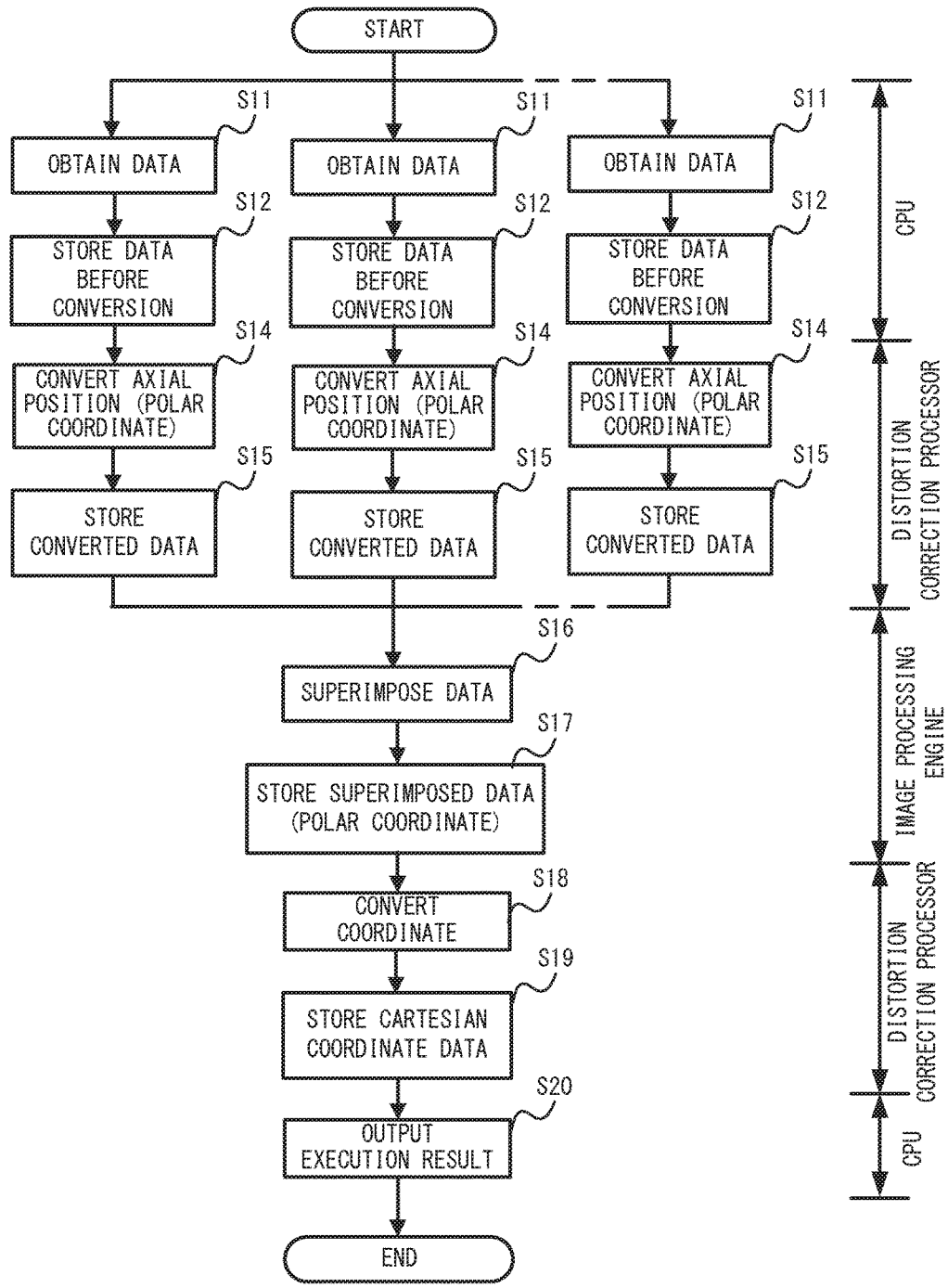
FIG. 11 is a flowchart showing an operation of surrounding environment recognition by the MCU for recognition according to the second embodiment.

As an operation of the on-board control system 1 according to the second embodiment is the same as the operation of the on-board control system 1 according to the first embodiment shown in FIG. 7, a description thereof will be omitted. Next, an operation of surrounding environment recognition (S1) by the MCU for recognition 20 according to the second embodiment will be described with reference to FIG. 11. FIG. 11 is a flowchart showing the operation of the surrounding environment recognition (S1) by the MCU for recognition 20 according to the second embodiment.

A flow of the operation of the on-board control system 1 according to the second embodiment is same as the flow of the operation of the on-board control system 1 according to the first embodiment shown in FIG. 8 except that a step S13 is not included in the flow of the operation of the on-board control 1 according to the second embodiment. That is, in the second embodiment, when startup of the on-board control system 1 is completed, the distortion correction processor 205 obtains the conversion tables from the external memory 30 and previously stores them in the internal memory 201. Note that in a manner similar to the first embodiment, the conversion tables may be stored in the internal memory 201 immediately before the plurality of axial position converting units 212 execute the axial position conversion. Although in the first embodiment, all operations are executed by the CPU 200, in the second embodiment, as described above, the axial position conversion (S14 and S15) and the coordinate conversion (S18 and S19) are executed by the distortion correction processor 205, and the data superimposition (S16 and S17) is executed by the image processing engine 206.

Figure 12:
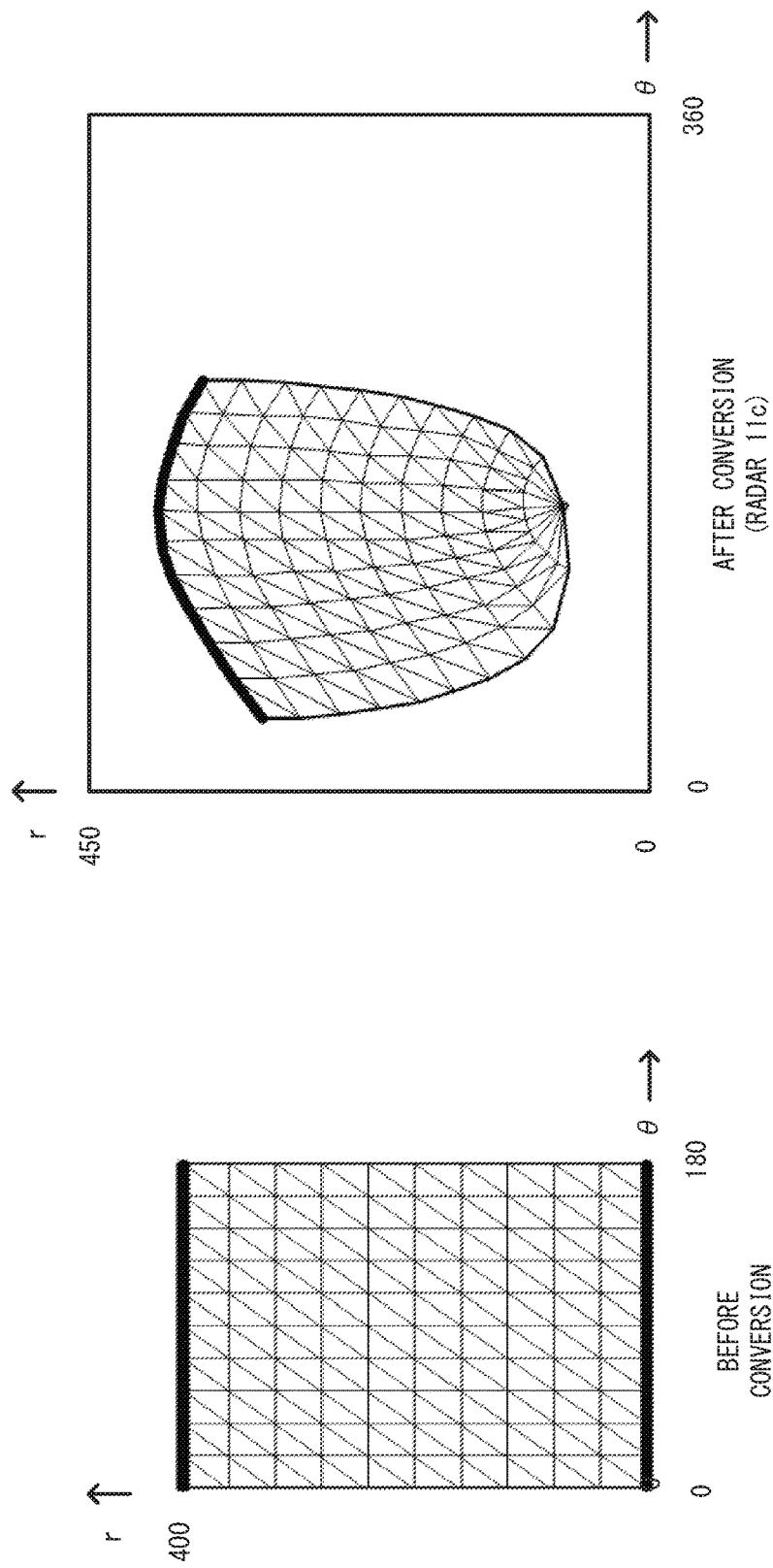
FIG. 12 is a drawing showing a polar coordinate data item before and after axial position conversion according to the second embodiment.

In the axial position conversion of the step S14, the distortion correction processor 205 defines continuous small triangle regions, which are indicated as "BEFORE CONVERSION" in FIG. 12, in a range in which the polar coordinate data item before the conversion indicates an existence probability of an object in the polar coordinate system. The triangle regions are obtained by dividing the polar coordinate data item before the conversion by a predetermined unit in the distance direction and by a predetermined unit in the angular direction in the polar coordinate system into a grid pattern along straight lines that are parallel to the r-axis and θ-axis, and by dividing each of a plurality of rectangles obtained by the previous division into two triangles.

In the first embodiment, although the conversion table includes information that associates the coordinates before and after the conversion for all coordinates for which the polar coordinate data item indicate the existence probabilities, in the second embodiment, the conversion table includes information that associates coordinates before and after the conversion only for coordinates of vertexes of the triangles defined by the polar coordinate data item before the conversion. Therefore, the distortion correction processor 205 reads out the polar coordinate data item before the conversion from the external memory 30, converts the coordinates of the vertexes of the triangles of the polar coordinate data item before the conversion using the conversion table, and then stores the converted polar coordinate data item in the external memory 30. This conversion is non-linear conversion in a manner similar to the first embodiment, as shown in FIG. 12.

The distortion correction processor 205 uses values of sides of the triangles in the converted polar coordinate data item as values of sides of the triangles in the polar coordinate data item before the conversion. When sizes or shapes of the triangles differ before and after the conversion, the distortion correction processor 205 enlarges, reduces, or performs interpolation to generate the values of the sides of the triangles in the converted polar coordinate data item from the values of the sides of the triangles in the converted polar coordinate data item. Further, the distortion correction processor 205 generates values inside the triangles by interpolating values inside the triangles according to the values of the vertexes and sides of the triangles. As this axial position conversion enables the polar coordinate data items to be aligned with the coordinates in which the center of the vehicle is used as the origin, it is possible to superimpose the polar coordinate data items, which will be described later.

Figure 13:
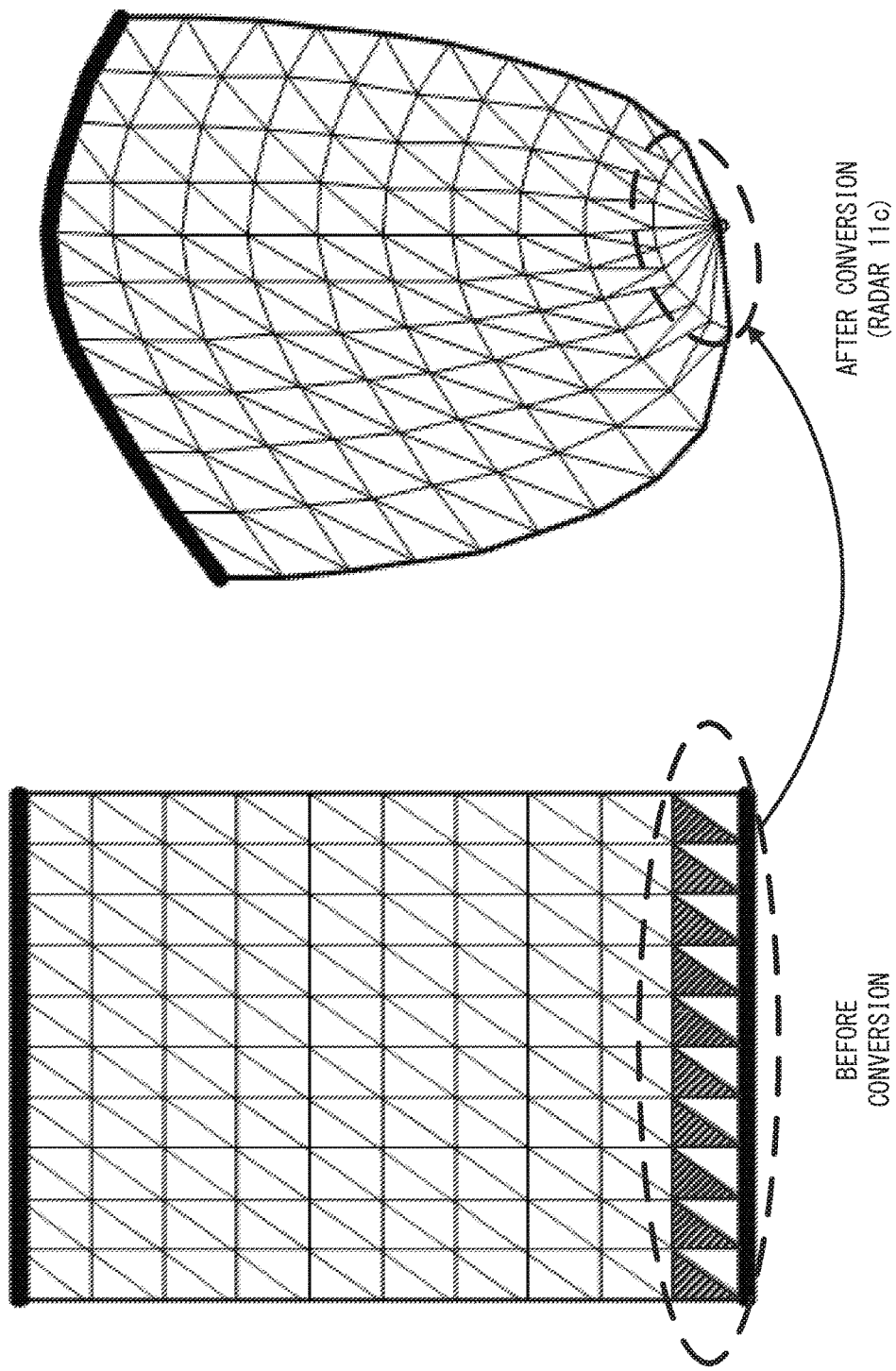
FIG. 13 is a drawing showing a polar coordinate data item before and after the axial position conversion according to the second embodiment.

As described above, in the converted polar coordinate data item, coordinates where r=0 in the polar coordinate data item before the conversion are aggregated to one point. Therefore, in the second embodiment, as shown in FIG. 13, when the coordinates at which the distance r is zero in the polar coordinate data item before the conversion are aggregated to one point in the polar coordinate data item after the conversion, triangles each having one vertex at which the distance is zero (shaded parts in FIG. 13) selected between the two triangles that are obtained by dividing a rectangle having a coordinate at which the distance is zero are converted into triangles having one point aggregated in the converted polar coordinate data item as vertexes of the triangles. Thus, even when the coordinates at which the distance r is zero in the polar coordinate data item before the conversion are aggregated to one point in the converted polar coordinate data item, the conversion can be performed while utilizing the function of the distortion correction processor 205 on which hardware dedicated for vertex processing of triangle mesh is mounted.

In the data superimposition of the step S16, the distortion correction processor 205 performs the axial position conversion on the polar coordinate data items corresponding to all radars 11a to 11f, and then the image processing engine 206 superimposes the polar coordinate data items. In regard to this superimposition, in a manner similar to that of the first embodiment, values at the same coordinate in the polar coordinate data items may be superimposed at a predetermined proportion, and the above expressions (2) and (3) based on the Bayes' theorem may be used.

For example, a table including information of a function that inputs the values A and B in the above expression (2) and outputs the result S in the above expression (3) may be previously stored in a memory (e.g., RAM (not shown)) included in the image processing engine 206. Then, the polar coordinate data items may be superimposed using this table. This table is, for example, previously stored in the external memory 30. When startup of the on-board control system 1 is completed, the image processing engine 206 obtains this table from the external memory 30 and stores it in a memory included in the image processing engine 206.

In the coordinate conversion of the step S18, the distortion correction processor 205 converts the superimposed data from data in the polar coordinate format into data in the Cartesian coordinate format. In a manner similar to that of the first embodiment, the above-mentioned general conversion expression for converting the above polar coordinate data item indicated by the distance r and the angle θ into the Cartesian coordinate data indicated by the horizontal direction X and the vertical direction Y can be used. However, in the second embodiment, unlike the first embodiment and in a manner similar to the above axial position conversion, the distortion correction processor 205 divides the superimposed data into continuous triangles in the polar coordinate system, and converts the coordinates of the vertexes of the triangles before and after the conversion using the conversion expression. Note that values of the sides and the inside of the triangles in the converted Cartesian coordinate data may be generated in a manner similar to the above axial position conversion.

Also note that a storage capacity of the external memory 30 necessary for storing the data is the same as that of the first embodiment. Thus, an effect of reducing the necessary storage capacity of the memory in the second embodiment is the same as that of the first embodiment.

As described above, in the second embodiment, the on-board control system 1 includes the CPU 200 that includes the system controlling unit 210, the data obtaining unit 211, and the result outputting unit 215 and dedicated circuits (the distortion correction processor 205 and the image processing engine 206) including the axial position converting units 212, the data superimposing unit 213, and the coordinate converting unit 214. That is, processing of the axial position conversion, the superimposition, and the Cartesian coordinate conversion, which is performed by the CPU 200 in the first embodiment, is performed by the dedicated distortion correction processor 205 and the image processing engine 206 in the second embodiment. By doing so, it is possible to reduce the time required for the CPU 200 to execute the processing and to achieve such processing in a shorter time than it takes to perform such processing in the first embodiment.

Moreover, in the second embodiment, the distortion correction processor 205 converts the coordinates of respective vertexes of the plurality of triangles obtained by dividing the polar coordinate data item before the axial position conversion so that their axial positions will be the same. At this time, the distortion correction processor 205 uses the values of the sides of the triangles in the polar coordinate data item on which the axial position conversion has been performed as the values of the sides of the triangles in the polar coordinate data item before the axial position conversion and interpolates the values inside the triangles by the values of the respective vertexes and sides of the triangles. As described above, in the axial position conversion processing, as the unit of processing has changed from all pixels to only the pixels of the vertexes of the triangles, the speed of processing by the CPU 200 can be expected to be 40 times as fast as the speed of processing in the first embodiment. Further, in the superimposition processing, as the calculated table is referred instead of using the calculation expressions, the speed of the processing can be expected to be about ten times as fast as the speed of processing in the first embodiment.

Third Embodiment

A third embodiment will be described next. In the following description of the third embodiment, contents similar to those described in the above first and second embodiments are denoted by the same reference signs, and descriptions thereof will be omitted as appropriate. As configurations of the on-board control system 1, the ECU 10, and the MCU for recognition 20 according to the third embodiment are the same as those of the on-board control system 1, the ECU 10, and the MCU for recognition 20 shown in FIGS. 1, 2, and 10, respectively, descriptions thereof will be omitted. Note that although an example in which filter processing, which will be described later, is applied to the on-board control system 1 according to the second embodiment will be described in the third embodiment, it is obvious that the filter processing, which will be described later, may be applied to the on-board control system 1 according to the first embodiment.

Figure 14:
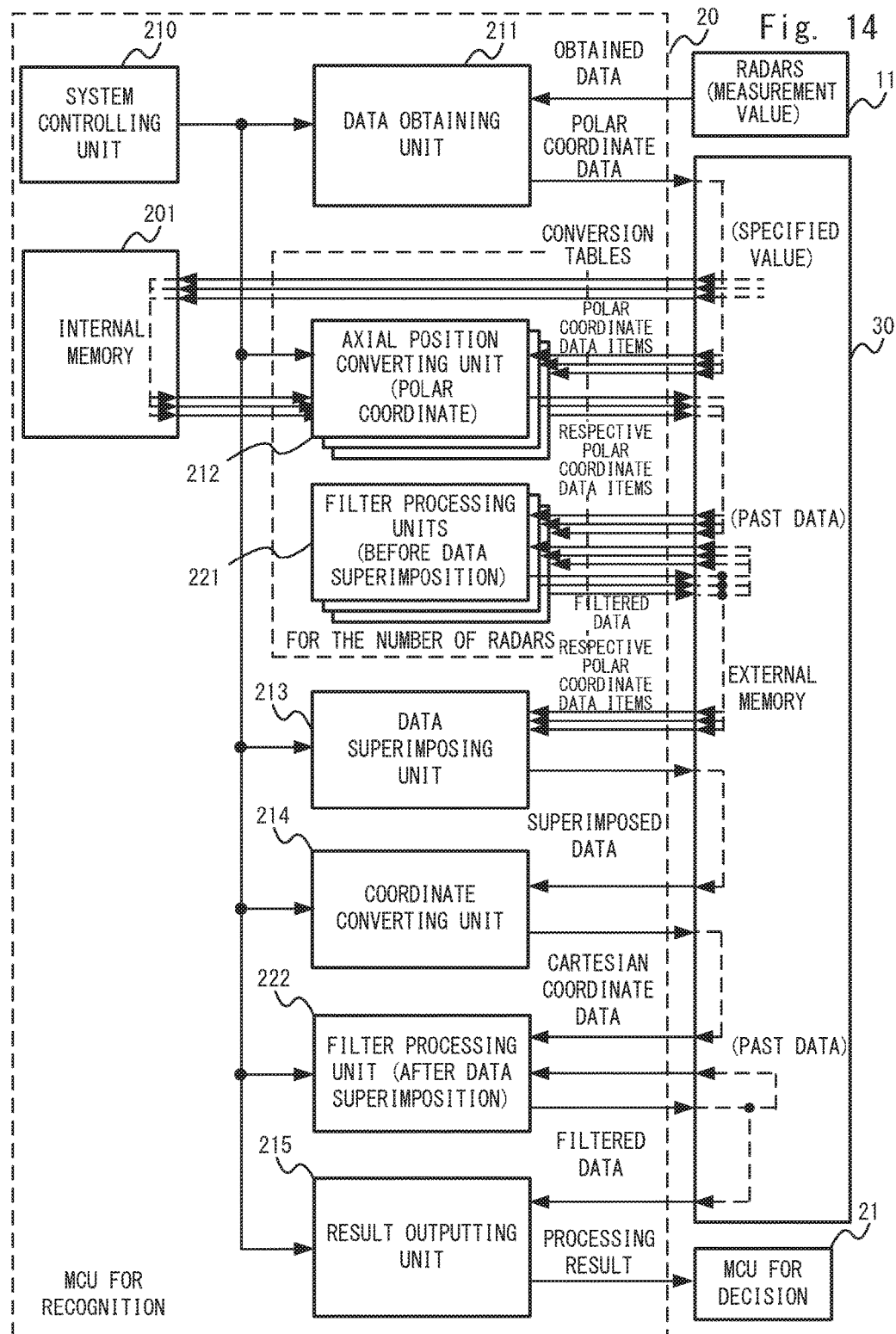
FIG. 14 is a functional block diagram showing an MCU for recognition according to a third embodiment.

Next, functional blocks of the MCU for recognition 20 according to the third embodiment will be described with reference to FIG. 14. As shown in FIG. 14, the MCU for recognition 20 has the same configuration as that of the MCU for recognition 20 according to the first and second embodiments shown in FIG. 4 and further includes a plurality of filter processing units 221 and a filter processing unit 222. The plurality of filter processing units 221 are included in the distortion correction processor 205, and the filter processing unit 222 is included in the image processing engine 206. However, it is not limited to this, and the CPU 200 may include the plurality of filter processing units 221 and the filter processing unit 222.

Each of the filter processing units 221 performs the filter processing on the converted polar coordinate data item stored in the external memory 30 using the polar coordinate data item that has been converted in the past. Although the polar coordinate data item that has been converted in the past is typically the polar coordinate data item that has been converted last time, it is not limited to this. For example, the polar coordinate data items that have been converted in the previous a few times may be used.

Each of the filter processing units 221 performs the filter processing on the respective converted polar coordinate data items corresponding to the radars 11a to 11f using the polar coordinate data items that have been converted in the past corresponding to the radars 11a to 11f, respectively. That is, the number of the filter processing units 221 is the same as that of the radars 11a to 11f. The filter processing units 221 correspond to the radars 11a to 11f, respectively, and process the polar coordinate data items generated according to the radar data items sent from the corresponding radars 11.

The filter processing unit 222 performs the filter processing on the Cartesian coordinate data stored in the external memory 30 using the Cartesian coordinate data in the past. Although the Cartesian coordinate data in the past is typically the Cartesian coordinate data that has been converted last time, it is not limited to this. For example, the Cartesian coordinate data that has been converted in the previous a few times may be used.

Figure 15:
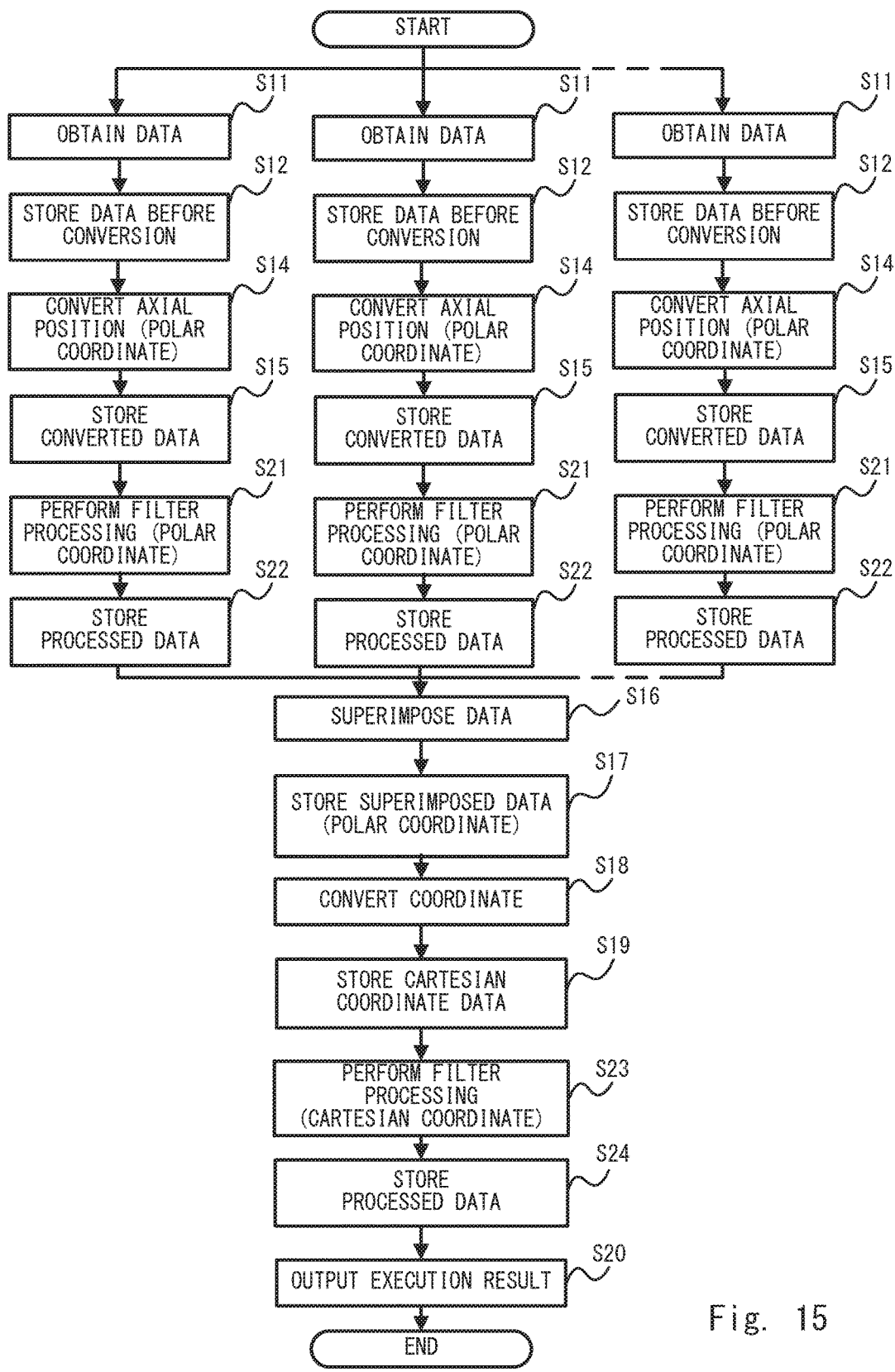
FIG. 15 is a flowchart showing an operation of surrounding environment recognition by the MCU for recognition according to the third embodiment.

As an operation of the on-board control system 1 according to the third embodiment is same as the operations of the on-board control systems 1 and 2 according to the first embodiment shown in FIG. 7, a description thereof will be omitted. Next, an operation of surrounding environment recognition (S1) by the MCU for recognition 20 according to the third embodiment will be described with reference to FIG. 15. FIG. 15 is a flowchart showing the operation of the surrounding environment recognition (S1) by the MCU for recognition 20 according to the third embodiment.

The operation of the surrounding environment recognition (S1) according to the third embodiment has the same steps as in the operation of the surrounding environment recognition (S1) according to the second embodiment shown in FIG. 11 and further includes steps S21 to S24. The steps S21 and S22 are performed after the step S15 is performed and before the step S16 is performed. The steps S23 and S24 are performed after the step S19 is performed and before the step S20 is performed.

After the step S15 is performed, each of the filter processing units 221 performs the filter processing on the polar coordinate data item on which the axial position conversion has been performed (S21). More specifically, each of the filter processing units 221 superimposes the converted polar coordinate data item that is being currently processed with a value at the same coordinate in the polar coordinate data item that has been converted in the past at a predetermined proportion. Each of the filter processing units 221 stores new polar coordinate data item generated by superimposing the polar coordinate data items in the external memory 30 (S22). The polar coordinate data items are processed by the data superimposing unit 213 (S16) and continued to be held in the external memory 30 so that the polar coordinate data items can be used as the polar coordinate data items on which the axial position conversion has been performed in the past in the surrounding environment recognition (S1) next time.

After the step S19 is performed, the filter processing unit 222 performs the filter processing on the Cartesian coordinate data on which the coordinate conversion has been performed (S23). More specifically, each of the filter processing units 222 superimposes the Cartesian coordinate data on which the coordinate conversion has been performed and that is currently being processed with a value at the same coordinate position in the Cartesian coordinate data on which the coordinate conversion has been performed in the past at a predetermined proportion. Each of the filter processing units 222 stores new Cartesian data generated by superimposing the Cartesian coordinate data in the external memory 30 (S24). The Cartesian coordinate data is processed by the result outputting unit 215 (S20) and continued to be held in the external memory 30 so that the Cartesian coordinate data can be used as the polar coordinate data items on which the coordinate position conversion has been performed in the past in the surrounding environment recognition (S1) next time.

Various methods for superimposing the polar coordinate data items at a predetermined proportion can be used for the superimposition in the steps S21 and S23. For example, in a manner similar to the data superimposition (S16), the above expressions (2) and (3) that are based on the Bayes' theorem may be used. That is, the result S obtained from the value A of each coordinate in the data that is being currently processed and the value B of the coordinate in the past data may be used as the value of the coordinate in the data on which the filter processing has been performed.

As described above, in the third embodiment, the filter processing unit 211 superimposes the data item on which the axial position conversion has been performed with the data item on which the axial position conversion has been performed in the past. The data superimposing unit 213 generates the superimposed data by superimposing the superimposed data on which the axial position conversion has been performed. Then, the filter processing unit 221 stores the superimposed data on which the axial position conversion has been performed in the storage unit so that the superimposed data on which the axial position conversion has been performed is used as the data on which the axial position conversion has been performed in the past for data on which the axial position conversion has been performed to be generated next.

Moreover, the filter processing unit 222 superimposes the data in the Cartesian coordinate format with the past data in the Cartesian coordinate format that is stored in the storage unit (the external memory 30). Then, the filter processing unit 222 stores the superimposed data in the Cartesian coordinate format in the storage unit so that the superimposed data in the Cartesian coordinate format is used as the past data in the Cartesian coordinate format for the data in the Cartesian coordinate format to be generated next.

As described above, by performing the filter processing using the past data as well as the current data, existence probabilities of an object can be calculated by superimposing a number of data items. Then, in the MCU for recognition 20, an existence probability will be greater at coordinate positions at which an existence probability of an object is high from the past to the present, while the existence probability will be lower at coordinate positions at which the existence probability of the object is low from the past to the present, as compared to the case in the first and second embodiments. That is, accuracy of the surrounding environment recognition can be further improved, thereby enabling the MCU for decision 21 to recognize an obstacle and evaluate as to whether or not to avoid the obstacle more accurately than in the first and second embodiments using a result of the recognition output from the MCU for recognition 20.

Although in the above description, an example in which the filter processing is applied to the converted polar coordinate data items and the converted Cartesian coordinate data has been described, it is not limited to this. The filter processing may be applied to the polar coordinate data items before the conversion and the superimposed data.

Although the invention carried out by the present inventor has been explained in detail based on the embodiments, it is obvious that the invention is not limited to the above embodiments, and various modification can be made without departing from the scope of the invention.

Although in the above embodiments, an example in which the data superimposition is performed by the expressions (2) and (3) which are based on the Bayes' theorem has been explained, it is not limited to this as long as it is a method that superimposes the data at a predetermined proportion. For example, a result of calculating an arithmetic average or a weighted average of values of the respective coordinates in the data may be used as the values of the respective coordinates after the superimposition.

In addition, although in the above embodiments, different conversion tables are prepared for the respective radars 11a to 11f, it is not limited to this. For example, the conversion tables may be prepared for either the radars 11 which are arranged to be point symmetric with respect to the center of the vehicle or the radars 11 which are arranged to be line symmetric with respect to a straight line passing through the center of the vehicle in the vertical or horizontal direction. For other radars 11, the conversion table may be converted in consideration of a symmetric property of the radars 11 and then used.

For example, in the converted polar coordinate data item corresponding to the radar 11c, a part corresponding to the polar coordinate data item before conversion is disposed as shown in FIG. 9. On the other hand, in the converted polar coordinate data item for the radar 11a that is line symmetric to the radar 11c with respect to a straight line passing through the center of the vehicle in the vertical direction, a part corresponding to the polar coordinate data item before the conversion is line symmetric to that of the radar 11c with respect to a straight line parallel to the r-axis at a position of 180 degrees. Accordingly, the conversion table for the radar 11c is converted in order to achieve a result that is line symmetric with respect to the straight line parallel to the r-axis at the position of 180 degrees, the conversion table corresponding to the radar 11a may be generated and used for the axial position conversion of the polar coordinate data corresponding to the radar 11a.

The above program executed by the CPU 200 can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
  a data obtaining unit that obtains a plurality of data items each indicating a result of observation from a plurality of radars for observing surroundings, converts the plurality of data items into data items in a polar coordinate format, and stores them in a storage unit;
  an axial position converting unit that performs conversion on the plurality of data items in the polar coordinate format stored in the storage unit so that their axial positions will be the same, generates the plurality of data items on which axial position conversion is performed, and stores them in the storage unit, wherein a memory space occupied in the storage unit by the plurality of data items on which axial position conversion has been performed corresponds to positions of the plurality of the radars in relation to a center point;
  a data superimposing unit that superimposes the plurality of data items on which the axial position conversion has been performed to generate superimposed data; and
  a coordinate converting unit that converts the superimposed data into data in a Cartesian coordinate format.

2. The semiconductor device according to claim 1, wherein
  the storage unit previously stores a correspondence information item that associates coordinates in a polar coordinate system before the axial position conversion with coordinates in the polar coordinate system on which the axial position conversion has been performed, and the axial position converting unit generates the data items on which the axial position conversion has been performed from the data items in the polar coordinate format before the conversion based on the correspondence information item.

3. The semiconductor device according to claim 2, wherein the plurality of radars are mounted at positions different from each other, the storage unit stores a plurality of the correspondence information items corresponding respectively to the plurality of radars, and the plurality of correspondence information items have contents different from each other according to the position at which the plurality of radars are mounted so that axial positions of the plurality of data items in the polar coordinate format will be the same.

4. The semiconductor device according to claim 1, wherein the data item on which the axial position conversion has been performed indicates an existence probability of an object at a coordinate in a polar coordinate system, when existence probabilities at the same coordinate indicated by the data item on which the axial position conversion has been performed are lower than a predetermined value, the data superimposing unit reduces an existence probability at the coordinate indicated by the superimposed data to be lower than any of the existence probabilities at the same coordinate, and when existence probabilities at the same coordinate indicated by the data item on which the axial position conversion has been performed are higher than the predetermined value, the data superimposing unit increases an existence probability at the coordinate indicated by the superimposed data to be greater than any of the existence probabilities at the same coordinate.

5. The semiconductor device according to claim 1, further comprising:
    a CPU that comprises the data obtaining unit; and
    a dedicated circuit that comprises the axial position converting unit, the data superimposing unit, and the coordinate converting unit.

6. The semiconductor device according to claim 5, wherein the dedicated circuit comprises a distortion correction processor including the axial position converting unit and the coordinate converting unit and an image processing engine including the data superimposing unit, and the distortion correction processor converts, in a polar coordinate system, coordinates of respective vertexes of a plurality of triangles obtained by dividing the data items in the polar coordinate format before the axial position conversion so that their axial positions will be the same, uses values of sides of the triangles in the data item on which the axial position conversion has been performed as values of sides of triangles in the data item in the polar coordinate format before the axial position conversion, and interpolates values inside the triangles by the values of the respective vertexes and the respective sides of the triangles.

7. The semiconductor device according to claim 6, wherein the plurality of triangles are obtained by dividing a plurality of rectangles into two, in which the plurality of rectangles are obtained by dividing the data item in the polar coordinate format before the conversion into a grid pattern along straight lines parallel to axes in the polar coordinate system, when coordinates at which a distance is zero in the data item in the polar coordinate format before the conversion are aggregated to one point in the data item on which the axial position conversion has been performed, the distortion correction processor converts triangles each having one vertex at which the distance is zero selected between the two triangles that are obtained by dividing a rectangle having a coordinate at which the distance is zero into triangles having one point aggregated in the converted polar coordinate data item as vertexes of the triangles.

8. The semiconductor device according to claim 1, further comprising a filter processing unit that superimposes the data on which the axial position conversion has been performed and past data on which the axial position conversion has been performed that is stored in the storage unit, wherein the data superimposing unit superimposes the data on which the axial position conversion has been performed to generate superimposed data, and the filter processing unit stores the superimposed data on which the axial position conversion has been performed in the storage unit so that the superimposed data on which the axial position conversion has been performed is used as the past data on which the axial position conversion has been performed for data on which the axial position conversion has been performed to be generated next.

9. The semiconductor device according to claim 1, further comprising a filter processing unit that superimposes data in the Cartesian coordinate format with past data in the Cartesian coordinate format that is stored in the storage unit, wherein the filter processing unit stores superimposed data in the Cartesian coordinate format in the storage unit so that the superimposed data in the Cartesian coordinate format is used as the past data in the Cartesian coordinate format for data in the Cartesian coordinate format to be generated next.

10. A control system comprising:
    a storage unit;
    a data obtaining unit that obtains a plurality of data items each indicating a result of observation from a plurality of radars for observing surroundings, converts the plurality of data items into data items in a polar coordinate format, and stores them in the storage unit;
    an axial position converting unit that performs conversion on the plurality of data items in the polar coordinate data format stored in the storage unit so that their axial positions will be the same, generates the plurality of data items on which axial position conversion has been performed, and stores them in the storage unit, wherein a memory space occupied in the storage unit by the plurality of data items on which axial position conversion has been performed corresponds to positions of the plurality of the radars in relation to a center point;
    a data superimposing unit that superimposes the plurality of data items on which the axial position conversion has been performed to generate superimposed data;
    a coordinate converting unit that converts the superimposed data into data in a Cartesian coordinate format;

an evaluating unit that determines control contents of an object to be controlled according to the superimposed data in the Cartesian coordinate format; and a controlling unit that controls the object to be controlled according to the control contents.

11. An observation method comprising steps of:

obtaining a plurality of data items using a semiconductor device, each data item indicating a result of observation from a plurality of radars for observing surroundings, converting the plurality of data items into data items in a polar coordinate format, and storing them in a storage unit;

performing conversion, using the semiconductor device, on the plurality of data items in the polar coordinate data format stored in the storage unit so that their axial positions will be the same, generating the plurality of data items on which axial position conversion has been performed, and storing them in the storage unit, wherein a memory space occupied in the storage unit by the plurality of data items on which axial position conversion has been performed corresponds to positions of the plurality of the radars in relation to a center point;

superimposing, using the semiconductor device, the plurality of data items on which the axial position conversion has been performed to generate superimposed data; and converting, using the semiconductor device, the superimposed data into data in a Cartesian coordinate format.

* * * * *